INVENTOR.
WARREN L. LEYDE
ROY E. PEARSON
BY Roger W. Jensen
ATTORNEY.

INVENTOR.
WARREN L. LEYDE
ROY E. PEARSON
BY Roger W. Jensen
ATTORNEY.

INVENTOR.
WARREN L. LEYDE
ROY E. PEARSON
BY Roger W. Jensen
ATTORNEY.

INVENTOR.
WARREN L. LEYDE
ROY E. PEARSON
BY Roger W. Jensen
ATTORNEY.

March 22, 1966 W. L. LEYDE ETAL 3,242,488
RADAR ALTIMETERS
Filed Feb. 5, 1962 11 Sheets-Sheet 8

INVENTOR.
WARREN L. LEYDE
ROY E. PEARSON
BY Roger W. Jensen
ATTORNEY.

FIG. 9

United States Patent Office 3,242,488
Patented Mar. 22, 1966

3,242,488
RADAR ALTIMETERS
Warren L. Leyde and Roy E. Pearson, Seattle, Wash.,
assignors to Honeywell Inc., a corporation of Delaware
Filed Feb. 5, 1962, Ser. No. 171,223
35 Claims. (Cl. 343—7.3)

This invention pertains to radar systems and more particularly to a pulse radar system for use as an altimeter or other distance measuring device.

Prior radio and radar altimeters are normally based upon frequency modulation principles. These prior art FM altimeters have certain limitations and disadvantages. For instance, height above ground indicated by FM techniques is found by measuring the frequency shift of the largest amplitude signal received from the ground. Where the ground surface includes irregularities such as buildings, hills, or other nonhorizontal specular, or scattering, reflecting surfaces, this signal may include sufficient components from objects more distant than the ground directly below the aircraft. These components may "weigh" the resultant in such a way that the altimeter reads a value greater than true height, an error in the "nonsafe" direction. This "averaging" effect takes place continuously as the altimeter passes over changing terrain. Therefore, the altimeter error caused by averaging is not constant; as the terrain surface varies, so does the error.

All prior art FM/CW altimeters thus far developed have suffered from resolution limited by allowable frequency deviation, resulting in measurement of altitude in "step" increments. Smoothing of the resultant signal does not eliminate the corresponding coarseness of altitude measurement. Furthermore, because FM altimeters utilize the frequency difference between transmitted and received signals as a measure of propagation time, they are inherently incapable of separating frequency shifts due to Doppler effect from the true altitude signal. This effect is particularly troublesome in applications to high speed aircraft.

The need for an accurate aircraft altimeter is obvious. Landing aircraft under conditions of low visibility has always posed serious problems, even with GCA, ILS, or other landing aids. Present doctrine for commercial aircraft is such that if any alternative to a blind or low-visibility landing is available, it is always utilized regardless of how inconvenient or expensive it may be. Perhaps the most critical problems in implementing a blind landing are those of precisely locating the aircraft as it approaches the runway. Its position in the horizontal plane with respect to the runway is important but can usually be determined wtih sufficient accuracy by glide slope instrumentation. The remaining parameter—precise height of the wheels above the runway at any given instant—is by far the most critical and also the most difficult to measure. An altitude measurement accuracy better than ±1 foot, with resolution of inches, is a requirement for a reasonably smooth landing.

Helicopter operations also reveal uses for a high accuracy altimeter. Helicopters and vertical-take-off aircraft encounter terrain avoidance and terrain clearance problems in every day operation. Vertical landings and helicopter troop and cargo transport missions involve many of these problems.

In addition to the above mentioned uses, a high accuracy altimeter is also extremely useful in aircraft engaged in tactical terrain reconnaissance or low level bombing missions.

The present invention meets the requirements for use in any of the above applications.

The altimeter of the present invention is a short pulse radar utilizing nanosecond transmitter output pulses. The reflected ground return pulses are converted to video pulses in the receiver and are fed to the altimeter tracking unit. Separate transmitting and receiving antennas minimize the blind range problem normally associated with pulse altimeters, that is, the receiver can listen through transmitted pulses and track all the way to the ground. The altimeter is a pulse altimeter and is therefore inherently free from the errors which plague FM/CW altimeters such as Doppler shift effects, step resolution, and return signal averaging. The altimeter electronic tracking unit continuously tracks the leading edges of the ground return pulses to obtain positive precision measurement of the shortest distance to the ground, with resolution in inches, regardless of such factors as terrain characteristics, aircraft speed, altitude or attitude. Altitude and altitude rate signals are derived in the electronic tracker. The electronic tracker utilizes a fully stabilized double integrating loop to eliminate altitude errors under continuous altitude rate conditions, and also provides electronic memory circuits to maintain continuity of output signals under momentary drop-out conditions.

The present invention comprises a transmitter section which includes a pulse modulator, a transmitter and a transmitter antenna. The pulse modulator drives the transmitter which in turn drives the transmitter antenna. The transmitter antenna radiates a pulse of RF energy toward the reflecting object, in this case the ground. The radiated pulses from the transmitter antenna have a very short pulse width, in the range of a few nanoseconds.

The reflected ground return pulse is received by the receiver antenna and is fed through an RF filter to a balanced mixer. In the balanced mixer the ground return pulse is mixed with a signal from the local oscillator and the output of the balanced mixer is fed through an IF amplifier and full wave detector to the output of the receiver.

The transmitter antenna and the receiver antenna are mounted so as to minimize antenna leakage effects.

A timing pulse from the transmitter section is fed to the input of a time modulator. The time modulator generates a sawtooth wave having a time duration which is a function of range. The output of a double range integrator is fed to a second input of the time modulator and the magnitude of this signal is compared with the instantaneous value of the range sawtooth. When the output of the double range integrator and the instantaneous value of the range sawtooth are equal a pulse is generated at the output of the time modulator and is fed to one input of a first coincident gate.

The output of the receiver is fed through a video amplifier to a second input of the first coincident gate. Therefore, both the output pulse from the time modulator and the output of the video amplifier are fed to inputs of the first coincident gate. These signals are compared in the coincident gate and a coincident gate output signal is developed which is proportional to the common area between the two input signals. The output of the first coincident gate is fed to the input of the double range integrator where it is integrated twice. The first output of the double range integrator is proportional to altitude rate while the second output of the double range integrator is proportional to altitude.

The time modulator produces a second output pulse which is called the track automatic gain control (TAGC) gate. The first, or track gate, output of the time modulator tracks the leading edge of the return video pulse, while the TAGC gate measures the peak of the return video pulse.

The output of the video amplifier is also fed to the input of a second coincident gate. The TAGC gate is fed to a second input of the second coincident gate so that the video pulse is allowed to pass through to the input of a signal level detector. The output of the second coincident gate is detected in the signal level detector and is fed to a first input of an automatic gain control (AGC) integrator. The output of the AGC integrator is fed to the receiver IF strip and controls the gain of the IF strip so that the return video pulses have a constant magnitude. This is necessary since the track gate tracks the leading edge of the return video pulse and this leading edge will vary if the amplitude of the video pulse varies, thereby giving an inaccurate altitude reading.

The automatic gain control circuit performs another important function in that it helps to allow the altimeter to track to substantially zero range. The pulse width of the transmitter pulse, in fact, is approximately 30 feet. This means that when the aircraft is below thirty feet the ground return pulse will occur during the transmitter pulse. In order for the altimeter to track the ground return pulse, some means must be employed to eliminate or minimize the effect of the transmitter leakage pulse. The automatic gain control performs this function. As aircraft altitude decreases, the strength of the ground return pulse increases. Since the AGC circuit tends to hold the magnitude of the ground return pulse constant, the AGC circuit must decrease the gain of the receiver and in so doing the effect of the transmitter leakage pulse is also decreased. The automatic gain control circuit thereby allows the altimeter to "see through" the transmitter pulse and to track all the way to the ground.

The output of the signal level detector is also fed to the altimeter logic and controls the energization of a first relay which connects a smoother to the output of the double range integrator, and a second relay which connects the output of the smoother to a meter which is calibrated in feet and which indicates the aircraft altitude.

The altimeter operates in two modes; the track mode, previously described, and the search mode. When the altimeter is in the search mode, the track gate is not tracking the leading edge of the video pulse and similarly the TAGC gate is not tracking the amplitude of the video pulse. Since the track gate and the TAGC gate do not occur in synchronism with the video pulse, both the first and the second coincident gates will be inhibited when the video pulse is applied to one of their inputs and hence there will be no output from either of the coincident gates. Since there is no output from the second coincident gate there is likewise no output from the signal level detector and therefore the input signal to the AGC integrator is removed, hence the gain control signal fed to the IF amplifier is removed and the IF strip operates at gain determined by the noise level on the video bus. Furthermore, when there is no output signal from the signal level detector, the altimeter logic drives the output of the double range integrator through the altitude range. Since the output of the double range integrator is connected to one of the inputs of the time modulator, the track gate output pulse from the time modulator will be swept through substantially the entire altitude range. As the track gate sweeps over the altitude range it will intercept the video pulse and at the same time the TAGC gate will intercept the peak of the video pulse. At this time the track gate will enable the first coincident gate while the TAGC gate will enable the second coincident gate thereby allowing the video pulse to pass through the coincident gates to the input of the double range integrator and the input of the signal level detector respectively. The output of the signal level detector will be, as explained previously, fed through the AGC integrator to the receiver IF strip and also to the altimeter logic circuitry thereby stopping the sweep output of the double range integrator. Similarly, the output of the first coincident gate will be fed to the double range integrator and the output of the double range integrator will indicate altitude.

A sensitivity range control (SRC) which drives its signal from the output of the double range integrator, is provided to reduce the receiver gain progressively as altitude range decreases from some predetermined magnitude to zero range. This prevents overload of the receiver during the search phase, and reduces the receiver sensitivity thereby minimizing weather effects.

A noise automatic gain control (NAGC) circuit is connected to the output of the video amplifier and is designed to respond to variations in the noise level on the video circuit and to substantially neglect the video pulses themselves. The output of the NAGC circuit is coupled to the input of the AGC integrator and, as explained previously, the output of the AGC integrator is connected to the IF strip on the receiver. In actuality, the output of the AGC integrator is a composite automatic gain control signal comprising the track AGC and the noise AGC.

It is one object of our invention, therefore, to provide an altimeter utilizing pulse radar techniques.

A further object of our invention is to provide a pulse radar altimeter wherein the transmitted pulse is of very short duration.

A further object of our invention is to provide a radar altimeter having a tracker unit which utilizes unbalanced leading edge tracking to track the return signal.

Another object of our invention is to provide a radar altimeter which will indicate altitude and rate of change of altitude.

Another object of our invention is to provide a radar altimeter which will automatically search for a lost target.

A further object of our invention is to provide a radar altimeter which will periodically recycle to insure that it is tracking a true target.

A still further object of our invention is to provide a radar altimeter having improved resolution.

Another object of our invention is to provide a radar altimeter which can track to substantially zero altitude.

Another object of our invention is to provide a radar altimeter which is inherently free of errors such as Doppler shift effects, step resolution, and return signal averaging.

These and other objects of our invention will become apparent to those skilled in the art upon consideration of the accompanying specification, claims, and drawings, of which:

FIGURES 3 through 10 show a schematic diagram of the altimeter's altitude track unit.

Figure 1:
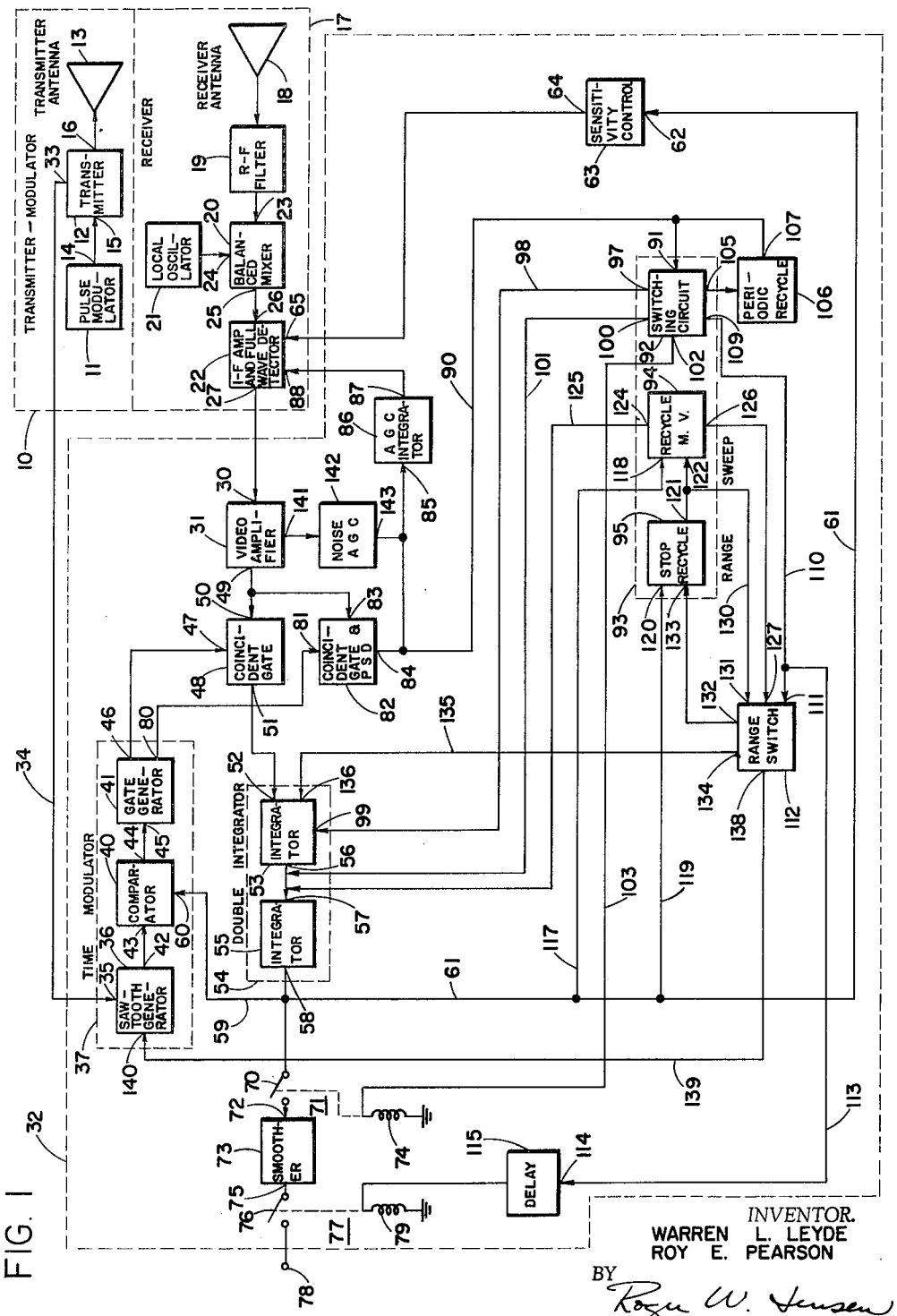
FIGURE 1 shows a block diagram of the altimeter system.

Referring to FIGURE 1 there is shown a transmitter-modulator unit 10 comprising a pulse modulator 11, a transmitter 12 and an antenna 13. An output 14 of pulse modulator 11 is connected to an input 15 of transmitter 12. An ouput 16 of transmitter 12 is connected to transmitter antenna 13. A receiver unit 17 comprises a receiver antenna 18, an RF filter 19, a balanced mixer 20, a local oscillator 21 and an IF amplifier and full wave detector 22.

Receiver antenna 18 is connected through RF filter 19 to an input 23 of the balanced mixer 20. The output of the local oscillator 21 is connected to a second input 24 of the balanced mixer 20. An output 25 of balanced mixer 24 is connected to an input 26 of the IF amplifier and full wave detector 22. An output 27 of the IF amplifier and full wave detector 22 is connected to an input 30 of a video amplifier 31 in the altitude tracker 32.

A timing output 33 of transmitter 12 is connected by means of a conductor 34 to an input 35 of a sawtooth generator 36 of a time modulator 37. Time modulator 37 further includes a comparator 40 and a gate generator 41. An output 42 of sawtooth generator 36 is connected to a first input 43 of comparator 40, an output 44 of comparator 40 is connected to an input 45 of gate generator 41.

A first output 46 of gate generator 41 is connected to a first input 47 of a coincident gate 48. An output 49 of video amplifier 31 is connected to a second input 50 of coincident gate 48. An output 51 of coincident gate 48 is connected to an input 52 of a first integrator 53 of double integrator 54. Double integrator 54 further includes a second integrator 55. An output 56 of first integrator 53 is connected to an input 57 of second integrator 55. An output 58 of second integrator 55 is connected by means of a conductor 59 to a second input 60 of the comparator 40.

Output 58 of integrator 55 is further connected by means of a conductor 61 to an input 62 of a sensitivity control circuit 63. An output 64 of sensitivity control circuit 63 is connected to an input 65 of the IF amplifier 22 of receiver 17. Output 58 of integrator 55 is further connected by means of a contact 70 of a relay 71 to an input 72 of a smoother circuit 73. Relay 71 further has a relay winding 74. An output 75 of smoother 73 is connected by means of a relay contact 76 of a relay 77 to an altitude output terminal 78. Relay 77 further has a relay winding 79.

A second output 80 of gate generator 41 is connected to an input 81 of a coincident gate 82. A second input 83 of coincident gate 82 is connected to output 49 of video amplifier 31. An output 84 of coincident gate 82 is connected to an input 85 of an AGC integrator 86. An output 87 of AGC integrator 86 is connected to an input 88 of the IF amplifier 22.

Output 84 of coincident gate 82 is coupled by means of a conductor 90 to an input 91 of a switching circuit 92 of the range sweep unit 93. Range sweep unit 93 further includes a recycle multivibrator 94 and a stop recycle circuit 95. A first output 97 of switching circuit 92 is connected by means of a conductor 98 to an inhibit input 99 of integrator circuit 53. An output 100 of switching circuit 92 is connected by means of a conductor 101 to the input 57 of integrator 55. An output 102 of switching circuit 92 is connected by means of a conductor 103 to relay winding 74 of relay 71. An output 105 of switching circuit 92 is connected to the input of a periodic recycle circuit 106. An output 107 of periodic recycle circuit 106 is connected to the input 91 of switching circuit 92. An output 109 of switching circuit 92 is connected by means of a conductor 110 to an input 111 of a range switch circuit 112, and by means of conductor 110 and a conductor 113 to an input 114 of a delay circuit 115. The output of delay circuit 115 is connected to relay winding 79 of relay 77.

Output 58 of integrator 55 is connected by means of conductor 61 and a conductor 117 to an input 118 of recycle multivibrator 94, and by means of conductor 61 and a conductor 119 to an input 120 of stop recycle circuit 95. An output 121 of stop recycle circuit 95 is connected to an input 122 of recycle multivibrator 94. An output 124 of recycle multivibrator 94 is connected by means of a conductor 125 to the input 57 of integrator 55. An output 126 of recycle multivibrator 94 is connected to an input 127 of range switch 112.

Output 121 of stop recycle circuit 95 is further connected by means of a conductor 130 to an input 131 of the range switch circuit 112. An output 132 of range switch 112 is connected to an input 133 of the stop recycle circuit 95. An output 134 of range switch 112 is connected by means of a conductor 135 to an input 136 of integrator 53. An output 138 of range switch 112 is connected by means of a conductor 139 to an input 140 of sawtooth generator 36.

An output 141 of video amplifier 31 is connected to the input of a noise automatic gain control circuit 142, and an output 143 of noise AGC circuit 142 is connected to the input 85 of the AGC integrator 86.

*Operation of FIGURE 1*

The operation of the circuit of FIGURE 1 is as follows: pulse modulator 11 generates nanosecond pulse width, 1000 watt pulses at a 40 kilocycle PRF. These pulses are fed from the output 14 of pulse modulator 11 to the input 15 of the transmitter unit 12, where they drive a miniature re-entrant cavity oscillator to 100 watts peak power. The output of transmitter 12 is fed to the transmitter antenna 13 and an RF energy pulse is radiated toward the target, in this case ground.

The reflected RF energy pulse is picked up by the receiver antenna 18 and is fed through RF filter 19 to the input 23 of the balanced mixer 20. The output of local oscillator 21 is fed to the input 24 of the balanced mixer 20. The ground return signal and the local oscillator signal are mixed in the balanced mixer and an IF frequency is generated at the output 25 of the balanced mixer. This IF frequency is coupled to the input 26 of the IF amplifier and full wave detector stage 22. The IF signal is then amplified and detected and a video signal appears at the output 27 of the IF amplifier and full wave detector stage 22. This video signal is coupled to the video amplifier 31 where it is amplified. The output of video amplifier 31 is coupled to the noise automatic gain control circuit 142. The noise AGC circuit 142 senses the noise level on the video output line and develops an output signal at its output terminal 143 which is proportional to this noise level. The output of the noise AGC circuit 142 is coupled through the automatic gain control integrator 86 to the input 88 of the IF amplifier and full wave detector 22, and it is used to hold the noise level on the video output to a prescribed level.

The amplified video signal appears at the output 49 of video amplifier 31 and is coupled to the input 50 of coincident gate 48 and to the input 83 of coincident gate 82.

Each time the transmitter 12 fires, a timing pulse appears at transmitter output terminal 33 and is coupled through conductor 34 to the input 35 of sawtooth generator 36. This timing pulse initiates the generation of a sawtooth signal which appears at the output 42 of sawtooth generator 36 and is coupled to the input 43 of comparator 40. The output appearing at terminal 58 of the double integrator 54 is coupled through conductor 59 to the input 60 of comparator 40. When the instantaneous magnitude of the sawtooth input to comparator 40 is equal to the magnitude of the output of double integrator 54 a signal will appear at output terminal 44 of comparator 40 and will be coupled to the input terminal 45 of gate generator 41.

This input to gate generator 41 causes a first and a second gate signal to appear at the gate generator output terminals 46 and 80, respectively. The first gate output, called the track gate, is coupled from output terminal 46 of gate generator 41 to the input terminal 47 of coincident gate 48, while the second gate output, called the track automatic gain control (TAGC) gate appears at output terminal 80 of gate generator 41 and is coupled to the input terminal 81 of coincident gate and peak sensing detector 82. The trailing edge of the TAGC gate appearing at output terminal 80 of gate generator 41 is delayed in time by a predetermined amount with respect to the trailing edge of the track gate appearing at output terminal 46 of gate generator 41. The track gate input to terminal 47 of coincident gate 48 enables the coincident gate during the leading edge of the video pulse coupled to input 50 of coincident gate 48, and thereby allows an output signal proportional to the leading edge of the video signal to appear at terminal 51 of coincident gate 48. The output signal from gate 48 is coupled to the input 52 of integrating circuit 53. This signal is integrated in integrator 53 and is coupled from the output 56 of integrator 53 to the input 57 of integrator 55. The signal at the output 56 of integrator 55 is proportional to the rate of change of altitude. As mentioned previously, this signal is coupled to the input 57 of integrator 55 where it is integrated. Since the input to integrator 55 was proportional to the rate of change of altitude the output appearing at output 58 of integrator 55 will be proportional to altitude. This signal is coupled through relay contact 70 to the input terminal 72 of smoother circuit 73. This signal is then smoothed in the smoother circuit and appears as a D.C. level at the output 75 of smoother 73. This altitude signal is coupled through relay contact 76 to altitude output terminal 78.

As mentioned previously, the altitude signal appearing at output terminal 58 of integrator 55 is also coupled through conductor 59 to input terminal 60 of comparator 40. The magnitude of the altitude signal determines at which point an output will appear at the output of comparator 40 and hence the time at which gate generator 41 will generate the track gate and the TAGC gate.

The TAGC gate fed to the input 81 of coincident gate and peak sensing detector 82, from the output 80 of gate generator 41, enables gate 82. When gate 82 is enabled the video signal appearing at its input 83 is fed through the gate and an output appears at output terminal 84 which is proportional to the peak amplitude of the video signal.

The output signal at terminal 84 of coincident gate and peak sensing detector 82 is coupled to the input 85 of the AGC integrator 86. The signal is integrated in integrator 86 and is coupled from integrator output terminal 87 to the input terminal 88 of the IF amplifier and full wave detector circuit 22 and controls the gain of the IF amplifier so as to hold the magnitude of the video pulses constant.

The output at terminal 84 of coincident gate and peak sensing detector 82 is further coupled by means of conductor 90 to the input 91 of switching circuit 92 thereby operating switching circuit 92 to its first state. When switching circuit 92 is in its first state an output appears at output erminal 102 and is coupled through conductor 103 to relay winding 74 of relay 71 energizing the winding and thereby closing relay contact 70. Furthermore, an output appears at output terminal 109 of switching circuit 92 and is coupled through conductor 110 to the input 111 of range switch 112, and by means of conductors 110, 113, and delay circuit 115 to relay winding 79 of relay 77 thereby energizing winding 79 and closing relay contact 76. As explained previously, when relay contact 70 is closed the altitude output of the double integrator 54 is connected to the input of smoother circuit 73 and when relay contact 76 is closed the output of smoother 73, or in other words the altitude signal, is connected to altitude output terminal 78. The signal at input terminal 111 of range switch 112 from the output 109 of switching circuit 92 inhibits the range switch 112 from periodically changing the altimeter range. When switching circuit 92 is in its first mode of operation an output will also appear at output terminal 105 of switching circuit 92 which will be coupled to the periodic recycle circuit 106. The output of the periodic recycle circuit 106 appearing at output terminal 107 is coupled back to the input 91 of switching circuit 92 and changes switching circuit 92 to its second mode of operation. The second mode of operation of switching circuit 92 will be explained more fully hereinafter.

Assume now that the track gate and the TAGC gate from the output of gate generator 41 lose track of the video pulse. In other words, assume that the track gate appearing at input 47 of coincident gate 48 is not coincident with the video pulse applied to input 50 of coincident gate 48, and similarly, the TAGC gate applied at input 81 of coincident gate and peak sensing detector 82 is not coincident with the video pulse applied to input 83 of gate 82. In this situation there will be no output from either coincident gate 48 or coincident gate and peak sensing detector 82 and hence it becomes necessary for the altimeter to switch over to a search mode so as to reestablish coincidence between the tracking gates and the video pulse.

This searching operation is accomplished as follows: when coincidence between the TAGC gate and the video pulse is lost there will be no output from the coincident gate and peak sensing detector 82 and hence there will be no input signal at terminal 91 of switching circuit 92. Therefore, switching circuit 92 switches to its second operating state.

When switching circuit 92 is in its second operating condition there is an output at output terminal 97 which is coupled through conductor 98 to an input 99 of integrator 53 thereby inhibiting integrator 53. At the same time that integrator 53 is inhibited a substantially step function signal appears at output terminal 100 of switching circuit 92 and is coupled through conductor 101 to the input 57 of integrator 55. This substantially step function input to integrator 55 is integrated and sweeps the output of integrator 55 to its positive limit. The output 58 of integrator 55 is coupled through conductor 61 and conductor 117 to the input 118 of recycle multivibrator 94. When the output of integrator 55 reaches its positive limit, recycle multivibrator 94 changes state and a substantially step function output appears at recycle multivibrator output 124. This signal is coupled through conductor 125 to the input 57 of integrator 55. This substantially step function signal is of an opposite polarity to the step function output of switching circuit 92, and hence this signal is integrated in integrator 55 and drives the output of integrator 55 to its negative limit. The output 58 of integrator 55 is connected by means of conductor 61 and conductor 119 to the input 120 of the stop recycle circuit 95. As the output of integrator 55 reaches its negative limit a signal appears at output 121 of stop recycle circuit 95 and is coupled to input 122 of recycle multivibrator 94 thereby resetting recycle multivibrator 94. When recycle multivibrator 94 is reset the step input signal disappears from recycle multivibrator output 124 and the step function output from switching circuit 92 again controls the operation of integrator 55 and tends to drive the output of the integrator toward its positive limit once more.

As the output of double integrator 54 sweeps over its range from the positive limit to the negative limit, the point at which the instantaneous magniude of the sawtooth waveform applied to input terminal 43 of comparator 40 will equal the magnitude of the output of the double integrator 54 applied to input 60 of comparator 40 will vary, and hence the time at which the output will appear on output terminal 44 of comparator 40 will also vary. Since the output of comparator 40 controls the time at which gate generator 41 generates the track gate and the TAGC gate the times of these gates will also vary and these gates will effectively be swept continuously up and back through substantially the limit of the altimeter range. At some point during their searching operation the track gate and the TAGC gate will intercept the video pulse from the output of video amplifier 31. At this time the track gate applied to terminal 47 of coincident gate 48 will be coincident with the video pulse applied to input terminal 50 of coincident gate 48 and hence an output will appear at output terminal 51. Similarly, the TAGC gate applied to terminal 81 of the coincident gate and peak sensing detector 82 will be coincident with the video pulse supplied to input terminal 83 and hence an output will once again appear at output terminal 84. As explained previously, the output on terminal 84 of coincident gate and peak sensing device 82 will switch switching circuit 92 to its first mode of operation and the altimeter will return to the track mode.

When the altimeter changes from its track mode of operation to its search mode of operation, and switching circuit 92 changes from its first mode to its second mode of operation, the output at output terminal 102 of switching circuit 92, which energizes relay winding 74 of relay 71, is not immediately removed, but rather there is a short time delay before relay winding 74 is de-energized. The purpose of this short time delay is to prevent the smoother from being disconnected from the output of double integrator 54 in the event that there is a momentary loss of coincidence between the track gate and TAGC gate and the video signal. Similarly, when switching circuit 92 changes from its first mode of operation to its second mode of operation and the output at output terminal 109 of switching circuit 92 disappears, delay circuit 115 prevents the immediate de-energization of relay winding 79 of relay 77. The delay of delay circuit 115 which inhibits the de-energization of relay winding 79 is substantially longer than the delay in switching circuit 92 that inhibits the de-energization of relay winding 74.

Smoother circuit 73 contains a memory, and hence this circuit will remember the aircraft's altitude at the moment that relay winding 74 is de-energized and relay contact 70 opens thereby disconnecting smoother 73 from the output of the double range integrator 54.

If the searching circuits of the altimeter are unable to reestablish coincidence between the video signal and the track gate and TAGC gate during the delay time of delay 115 then relay winding 79 will be de-energized and relay contact 76 will open, thereby removing the altitude signal from the altitude output terminal 78. At the same time that the altitude indicator drops to zero an indicator light will light thereby indicating to the pilot of the aircraft that the altimeter is in the search mode. As soon as coincidence is reestablished between the video signal and the track gate and TAGC gate relay winding 74 and 79 will again be energized and the altitude indicator will indicate present altitude.

Range switch 112 operates on three different modes: short range, long range, and automatic. When the range switch is set for short range the altimeter will indicate altitude from zero feet to the maximum of the short range. Similarly, when the range switch is in the long range position the altimeter will indicate altitude from zero up to the maximum of the long range. However, when the range switch is in the automatic position the range on which the altimeter operates is determined by the altitude of the aircraft. In other words, when the aircraft is low enough so that its altitude is in the range of the altimeters short range position then the altimeter will automatically switch to its short range. Similarly, when the aircraft altitude increases above the range of the short range position then the altimeter will automatically switch to its long range. Output 138 of range switch 112 is connected to input 140 of sawtooth generator 36 and operates to change the values of circuit components as the altimeter switches from short range to long range and vice versa. Similarly, output 134 of range switch 112 is connected to input 136 of integrator 53 and output 132 of range switch 112 is connected to input 133 of stop recycle circuit 95.

The automatic range switch operation is accomplished as follows: Assume that the altimeter is operating on its long range and that the altitude of the aircraft is decreasing. In this situation the output of the double integrator circuit 54 will also be decreasing. This decreasing output from double integrator 54 is coupled through conductor 61 and conductor 119 to the input 120 of stop recycle circuit 95. When the signal at the output of double integrator 54 decreases to a value corresponding to the maximum range of the altimeter's short range, stop recycle circuit 95 produces an output at its output terminal 121 which is coupled to the input 131 of range switch 112 thereby switching the altimeter to its short range.

Assume now that the aircraft is flying at an altitude below the maximum range of the altimeter's short range position, and that the altitude of the aircraft is increasing. As the aircraft's altitude increases the output from double integrator 54 will also increase and this increasing signal will be coupled through conductor 61 and conductor 117 to the input 118 of recycle multivibrator 94. When this signal level at input 118 of recycle multivibrator 94 becomes equal to the value proportional to approximately the maximum range of the short range, recycle multivibrator 94 changes state and an output appears at multivibrator output terminal 126 and is coupled to input 127 of range switch 112 thereby switching the range switch to its long range position.

When the altimeter is in its search mode, switching circuit 92 is in its second position and the output signal at output terminal 109 of switching circuit 92 is removed. Since this circuit is removed, the inhibiting signal to input 111 of range switch 112 is also removed and the range switch will periodically change the altimeter range. That is, the range of the altimeter will periodically change from the short range to the long range and then back to the short range again. This operation will continue as long as the altimeter remains in the search mode. The purpose of this type of operation is to allow the altimeter to search for a specific amount of time on each range.

As explained previously, when the altimeter is in the tracking mode, switching circuit 92 is in its first position and therefore an output signal appears at output 105 of switching circuit 92 and is coupled to the periodic recycle circuit 106. Periodic recycle circuit 106 then periodically applies a signal from its output 107 to the input 91 of switching circuit 92 and operates switching circuit 92 to its second operating position thereby causing the altimeter to go into its search mode. The purpose of this periodic recycle, or periodic searching, is to insure that the altimeter has not locked in on a false target. The operation of this periodic recycling is so short that relay winding 79 does not deenergize and therefore the altitude indication at altitude output terminal 78 is not disturbed.

*Structure of FIGURES 2 through 10*

Figure 2:
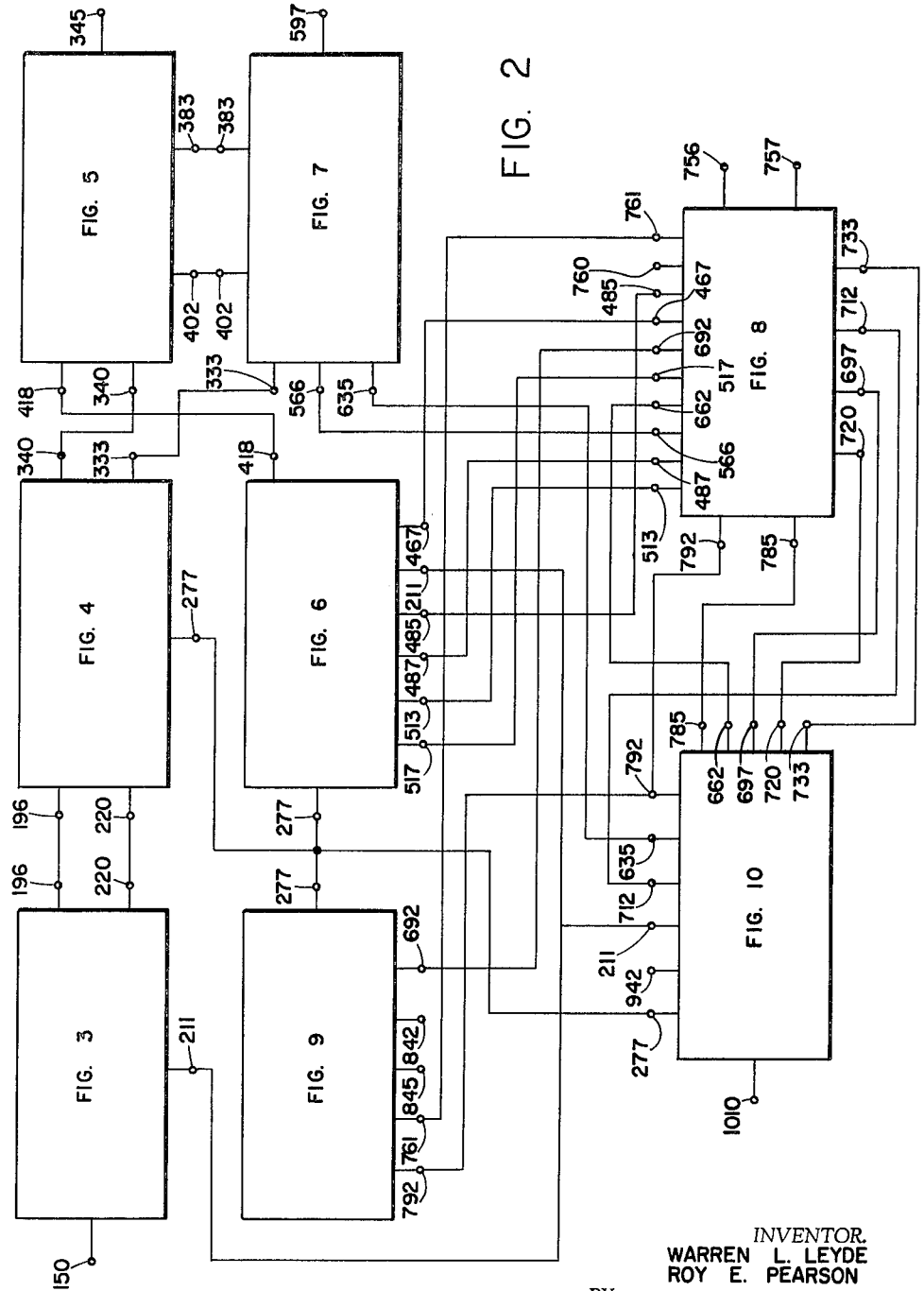
FIGURE 2 shows an interconnection diagram of FIGURES 3 through 10.

Referring to FIGURE 2 there is shown an inter-connection diagram of FIGURES 3 through 10 which comprise the altitude tracking unit. The output terminal from one figure and the corresponding input terminal to another figure are designated by the same numeral.

Figure 3:
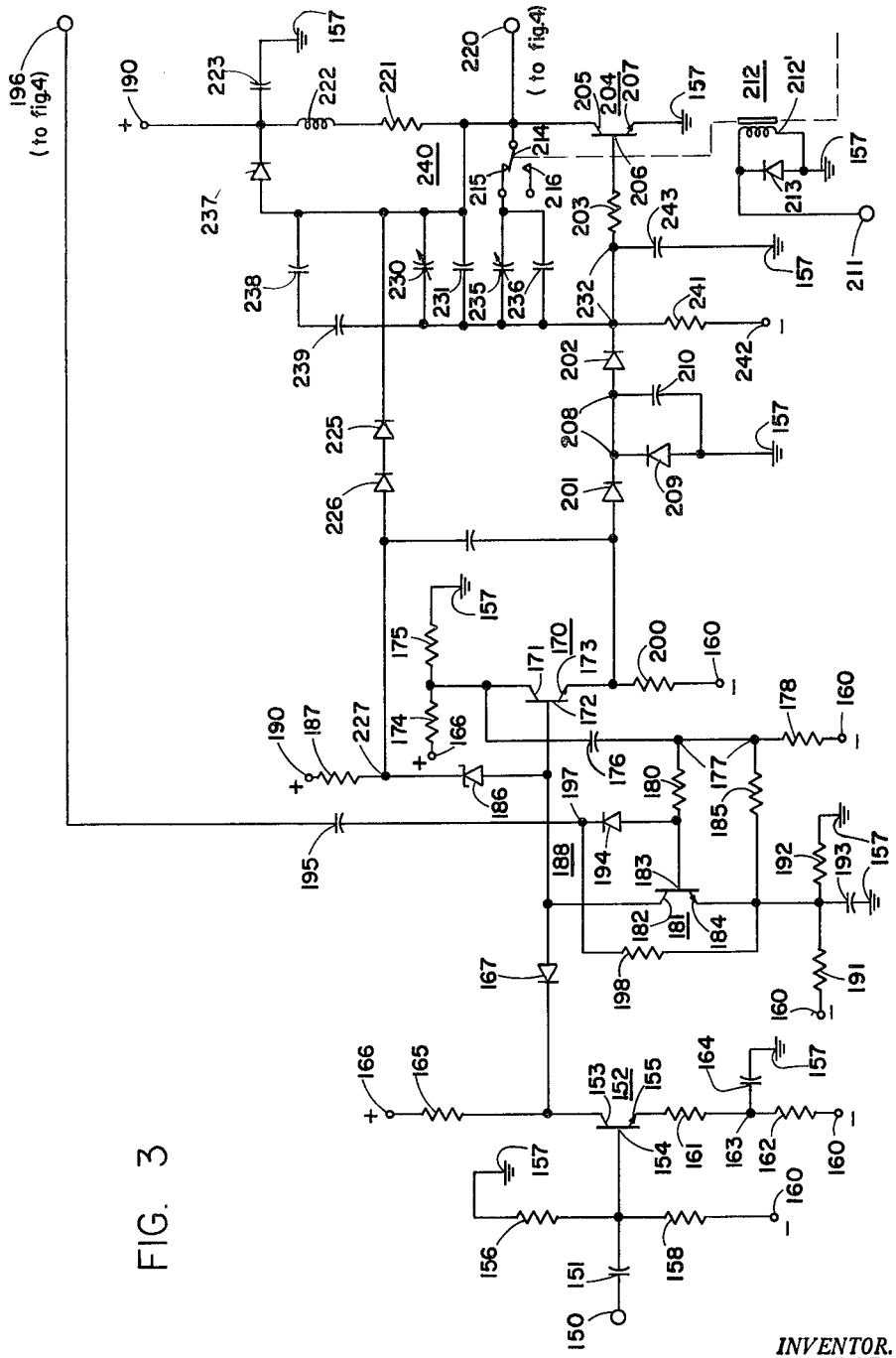

Referring to FIGURE 3 there is shown an input terminal 150 connected by means of a capacitor 151 to a base 154 of a transistor 152. Transistor 152 further has a collector 153 and an emitter 155. Base 154 of transistor 152 is connected by means of a resistor 156 to a source of reference potential, in this case ground 157, and by means of a resistor 158 to a source of negative energizing potential 160. Emitter 155 of transistor 152 is connected by means of a resistor 161 in series with a resistor 162 to the negative potential source 160. A junction 163 between resistors 161 and 162 is connected by means of a capacitor 164 to ground 157. Collector 153 of transistor 152 is connected by means of a resistor 165 to a source of positive energizing potential 166.

Collector 153 of transistor 152 is further connected by means of a reverse poled diode 167 to a base 172 of a transistor 170. Transistor 170 further has a collector 171 and an emitter 173. Collector 171 of transistor 170 is connected by means of a resistor 174 to the positive potential source 166, and by means of a resistor 175 to ground 157. Collector 171 of transistor 170 is further connected by means of a capacitor 176, a junction 177, and a resistor 178 to the negative potential source 160. Junction 177 is connected by means of a resistor 180 to a base 183 of a transistor 181. Transistor 181 further has a collector 182 and an emitter 184. Junction 177 is further connected by means of a resistor 185 to the emitter 184 of transistor 181.

Transistors 170 and 181, along with their associated circuitry, form a multivibrator circuit 188.

Base 172 of transistor 170 is directly connected to the collector 182 of transistor 181, and is further connected by means of a Zener diode 186 in series with a resistor 187 to a source of positive energizing potential 190.

Emitter 184 of transistor 181 is connected by means of a resistor 191 to the negative potential source 160, and by means of a resistor 192 in parallel with a capacitor 193 to ground 157. Base 183 of transistor 181 is connected by means of a diode 194 in series with a capacitor 195 to a terminal 196. A junction 197 between diode 194 and capacitor 195 is connected by means of a resistor 198 to the emitter 184 of transistor 181.

Emitter 173 of transistor 170 is connected by means of a resistor 200 to the negative potential source 160, and by means of a diode 201, a diode 202, and a resistor 203 to a base 206 of a transistor 204. Transistor 204 further has a collector 205 and an emitter 207.

Emitter 207 of transistor 204 is directly connected to ground 157. The junction 208 between diodes 201 and 202 is connected to ground 157 by means of a reverse poled diode 209 in parallel with a capacitor 210.

A terminal 211 is connected to ground 157 by means of a relay winding 212′ of a relay 212 in parallel with a reverse poled diode 213. Associated with relay winding 212′ are a movable contact 214, a fixed contact 215, and a fixed contact 216 (shown on FIGURE 3) and a movable contact 217, a fixed contact 218, and a fixed contact 219 (shown on FIGURE 4).

Collector 205 of transistor 204 is connected directly to a terminal 220, and by means of a resistor 221 in series with a coil 222 to the positive potential source 190. Positive potential source 190 is connected by means of a capacitor 223 to ground 157. Collector 205 of transistor 204 is connected by means of a reverse poled diode 225 in series with a reverse poled diode 226 to a junction 227 between Zener diode 186 and resistor 187, by means of a variable capacitor 230 in parallel with a fixed capacitor 231 to a junction 232 between diode 202 and resistor 203. Collector 205 of transistor 204 is further connected to the movable contact 214 of relay 212. Fixed contact 215 of relay 212 is connected by means of a variable capacitor 235 in parallel with a fixed capacitor 236 to junction 232.

Collector 205 of transistor 204 is connected by means of a diode 237 to the positive potential source 190, and by means of a capacitor 238 in series with a capacitor 239 to junction 232. Transistor 204 and its associated circuitry form a sawtooth generator 240.

Junction 232 is connected by means of a resistor 241 to a negative source of energizing potential 242, and by means of a capacitor 243 to ground 157.

Figure 4:
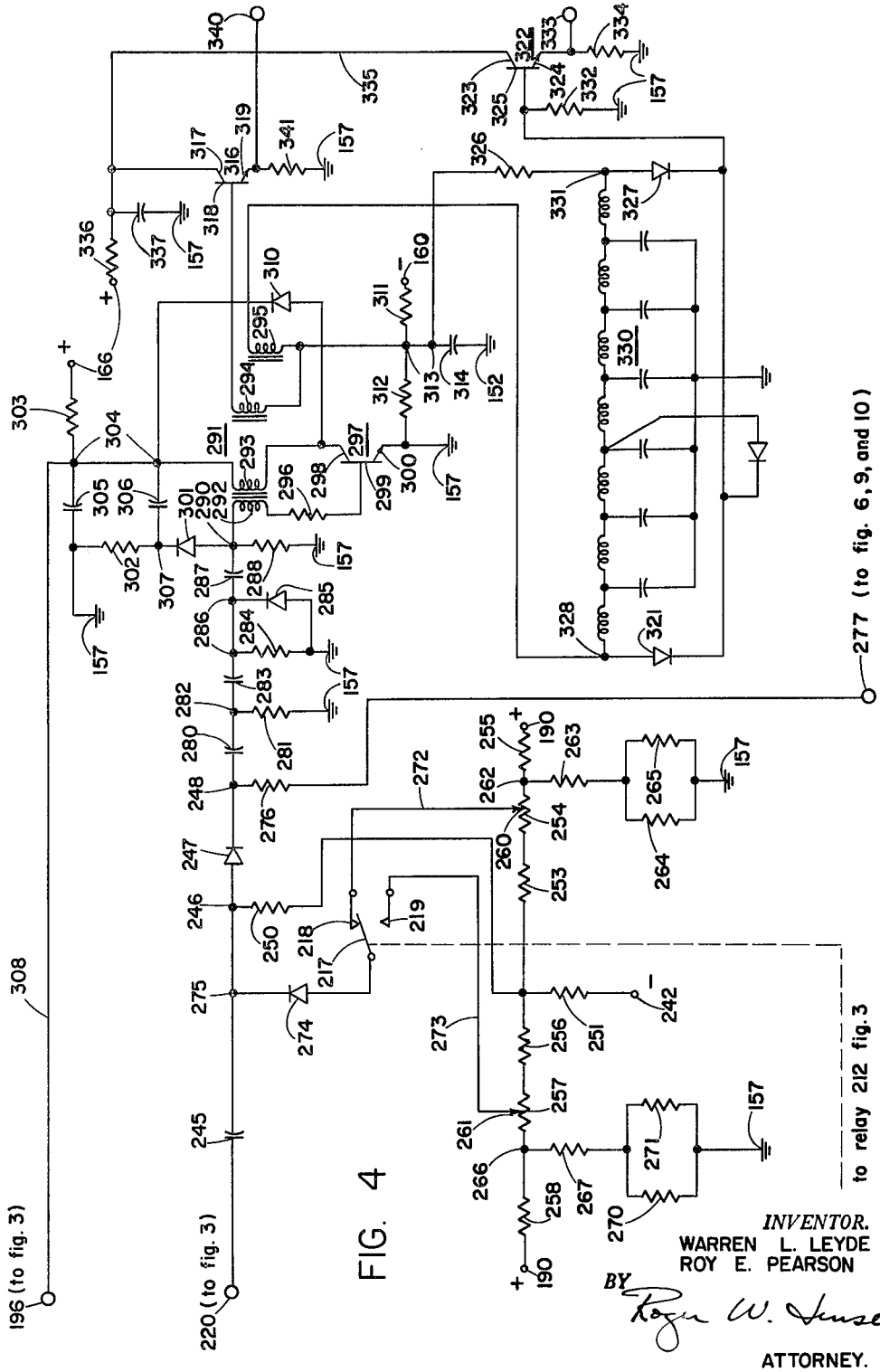

Referring to FIGURE 4, terminal 220 is connected by means of a capacitor 245 to the anode 246 of a diode 247. Diode 247 further has a cathode 248. Anode 246 of diode 247 is connected by means of a resistor 250 in series with a resistor 251 to the negative potential source 242. A junction between resistors 250 and 251 is connected by means of a resistor 253, a potentiometer 254, and a resistor 255 to the positive potential source 190, and by means of a resistor 256, a potentiometer 257, and a resistor 258 to the positive potential source 190. Potentiometer 254 has a wiper 260. Potentiometer 257 has a wiper 261. A junction 262 between potentiometer 254 and resistor 255 is connected by means of a resistor 263 in series with a parallel combination of a resistor 264 and a temperature compensating resistor 265 to ground 157. A junction 266 between potentiometer 257 and resistor 258 is connected by means of a resistor 267 in series with a parallel combination of a resistor 270 and a temperature compensating resistor 271 to ground 157. Wiper 260 of potentiometer 254 is connected by means of a conductor 272 to the fixed contact 218 of relay 212, while wiper 261 of potentiometer 257 is connected by means of a conductor 273 to fixed contact 219 of relay 212. Movable contact 217 of relay 212 is connected by means of a diode 274 to a junction 275 between capacitor 245 and anode 246 of diode 247. Cathode 248 of diode 247 is connected by means of a resistor 276 to a terminal 277.

Cathode 248 of diode 247 is connected to ground by means of a capacitor 280 in series with a resistor 281. A junction 282 between capacitor 280 and resistor 281 is connected by means of a capacitor 283 in series with the resistor 284 to ground 157. A reverse poled diode 285 is connected from a junction 286 between capacitor 283 and resistor 284 to ground 157.

Junction 286 between capacitor 283 and resistor 284 is connected by means of a capacitor 287 in series with the resistor 288 to ground 157. A junction 290 between capacitor 287 and resistor 288 is connected by means of a secondary winding 292 of a transformer 291 in series with a resistor 296 to a base 299 of a transistor 297. Transistor 297 further has a collector 298 and an emitter 300. Transformer 291 further has a primary winding 293, a secondary winding 294, and a secondary winding 295. Junction 290 is further connected by means of a diode 301 in series with the resistor 302 to ground 157. Collector 298 of transistor 297 is connected by means of primary winding 293 of transformer 291 in series with a resistor 303 to the positive potential source 166. A junction 304 between primary winding 293 of transformer 291 and resistor 303 is connected by means of a capacitor 305 to ground 157, by means of a capacitor 306 to a junction 307 between diode 301 and resistor 302, and by means of a conductor 308 to terminal 196. Collector 298 of transistor 297 is further connected by means of a diode 310 to junction 304. Emitter 300 of transistor 297 is connected directly to ground 157. Positive potential source 160 is connected by means of a resistor 311 in series with a resistor 312 to ground 157. A junction 313 between resistors 311 and 312 is connected to ground by means of a capacitor 314. Junction 313 is further connected by means of secondary winding 294 of transformer 291 to a base 318 of a transistor 316. Transistor 316 further has a collective 317 and an emitter 319. Junction 313 is further connected by means of secondary winding 295 of transformer 291 in series with a diode 321 to the base 325 of a transistor 322. Transistor 322 further has a collector 323 and an emitter 324.

Terminal 313 is connected by means of a resistor 326 in series with a diode 327 to the base 325 of transistor 322. A junction 328 between secondary winding 295 of transformer 291 and diode 321 is connected by means of a delay line 330 to a junction 331 between resistor 326 and diode 327. Base 325 of transistor 322 is connected to ground by means of a resistor 332. Emitter 324 of transistor 322 is connected directly to a terminal 333 and by means of a resistor 334 to ground 157. Collector 323 of transistor 322 is connected by means of a conductor 335 to the collector 317 of transistor 316, by means of a resistor 336 to the positive potential source 166, and by means of a capacitor 337 to ground 157.

Emitter 319 of transistor 316 is connected directly to a terminal 340, and by means of a resistor 341 to ground 157.

Figure 5:
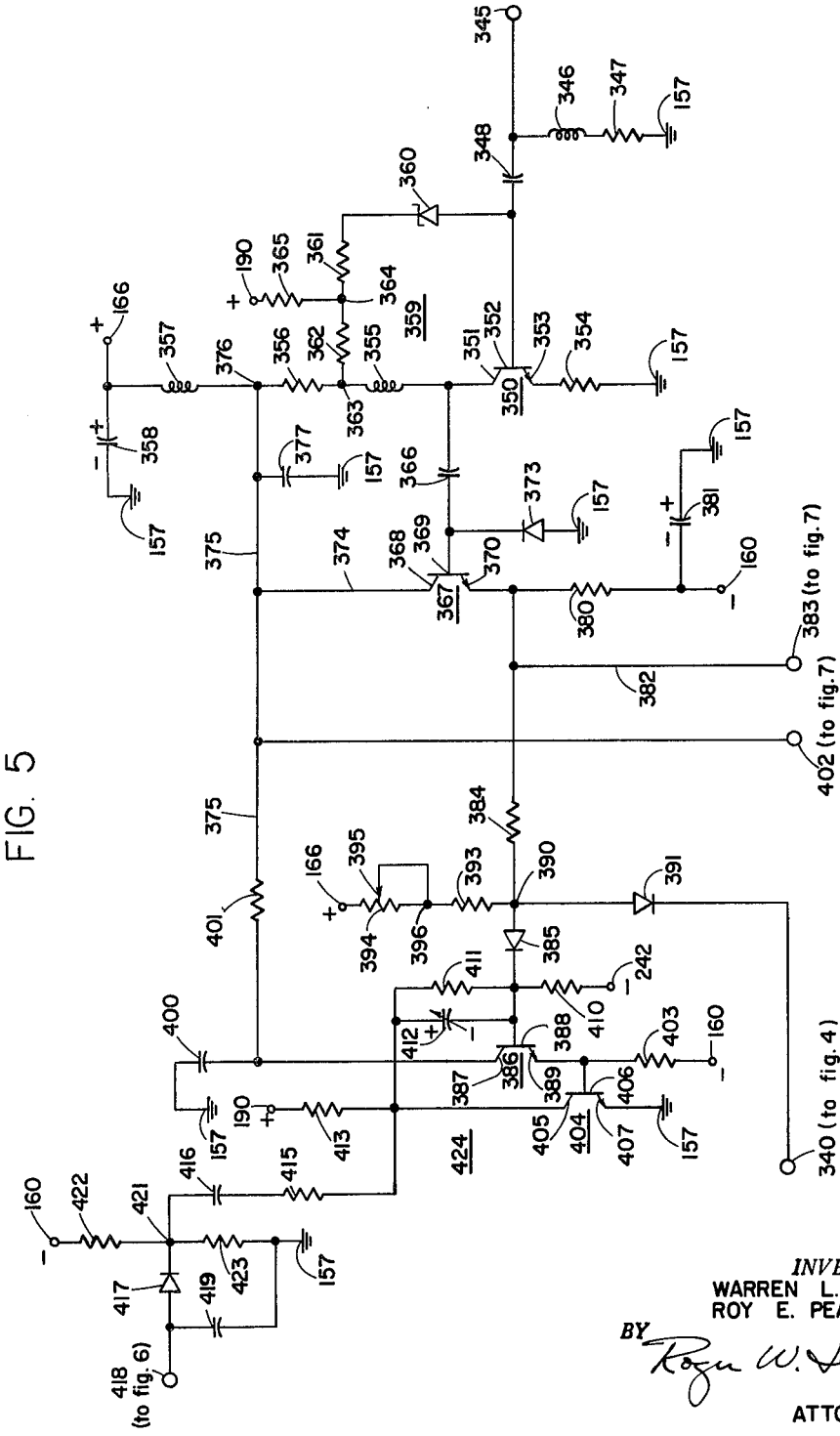

Referring to FIGURE 5 there is shown a terminal 345 connected by means of a coil 346 in series with a resistor 347 to ground 157, and by means of a capacitor 348 to a base 352 of a transistor 350. Transistor 350 further has a collector 351 and an emitter 353. Emitter 353 of transistor 350 is connected to ground 157 by means of a resistor 354. Collector 351 of transistor 350 is connected by means of a coil 355, a resistor 356, and a coil 357, to the positive potential source 166. Positive potential source 166 is connected to ground 157 by means of a capacitor 358.

Base 352 of transistor 350 is connected by means of a Zener diode 360, a resistor 361, and a resistor 362 to a junction 363 between coil 355 and resistor 356. A junction 364 between resistor 361 and resistor 362 is connected by means of a resistor 365 to the positive potential source 190.

Collector 351 of transistor 350 is connected by means of a capacitor 366 to a base 369 of a transistor 367. Transistor 367 further has a collector 368 and an emitter 370. Base 369 of transistor 367 is connected to ground 157 by means of a reverse poled diode 373. Collector 368 of transistor 367 is connected by means of a conductor 374 and a conductor 375 to a junction 376 between resistor 356 and coil 357. Conductor 375 is connected to ground 157 by means of a capacitor 377. Emitter 370 of transistor 367 is connected by means of a resistor 380 through the negative potential source 160. The negative potential source 160 is connected by means of a capacitor 381 to ground 157. Transistors 350 and 367, and their associated circuitry, comprise a video amplifier 359.

Emitter 370 of transistor 367 is further connected by means of a conductor 382 to a terminal 383, and by means of a resistor 384 in series with a diode 385 to a base 388 of a transistor 386. Transistor 386 further has a collector 387 and an emitter 389. A junction 390 between resistor 384 and diode 385 is connected by means of a diode 391 to terminal 340, and by means of a resistor 393 in series with a potentiometer 394 to the positive potential source 166. Potentiometer 384 further has a wiper 395 which is connected to a junction 396 between resistor 393 and potentiometer 394. Collector 387 of transistor 386 is connected by means of a capacitor 400 to ground 157, and by means of a resistor 401 to conductor 375. Conductor 375 is further connected to a terminal 402.

Emitter 389 of transistor 386 is connected to the negative potential source 160 by means of a resistor 403, and is further directly connected to a base 406 of a transistor 404. Transistor 404 further has a collector 405 and an emitter 407. Emitter 407 of transistor 404 is directly connected to ground 157.

Base 388 of transistor 386 is connected to the negative potential source 242 by means of a resistor 410, and to the collector 405 of transistor 404 by means of a resistor 411 in parallel with a variable capacitor 412. Collector 405 of transistor 404 is connected to the positive potential source 190 by means of a resistor 413.

Collector 405 of transistor 404 is further connected by means of a resistor 415, a capacitor 416, and a reverse poled diode 417 to a terminal 418. Terminal 418 is further connected by means of a capacitor 419 to ground 157. A terminal 421 between capacitor 416 and diode 417 is connected to the negative potential source 160 by means of a resistor 422, and to ground 157 by means of a resistor 423. Transistors 386 and 404, along with their associated circuitry, form a coincident circuit 424.

Figure 6:
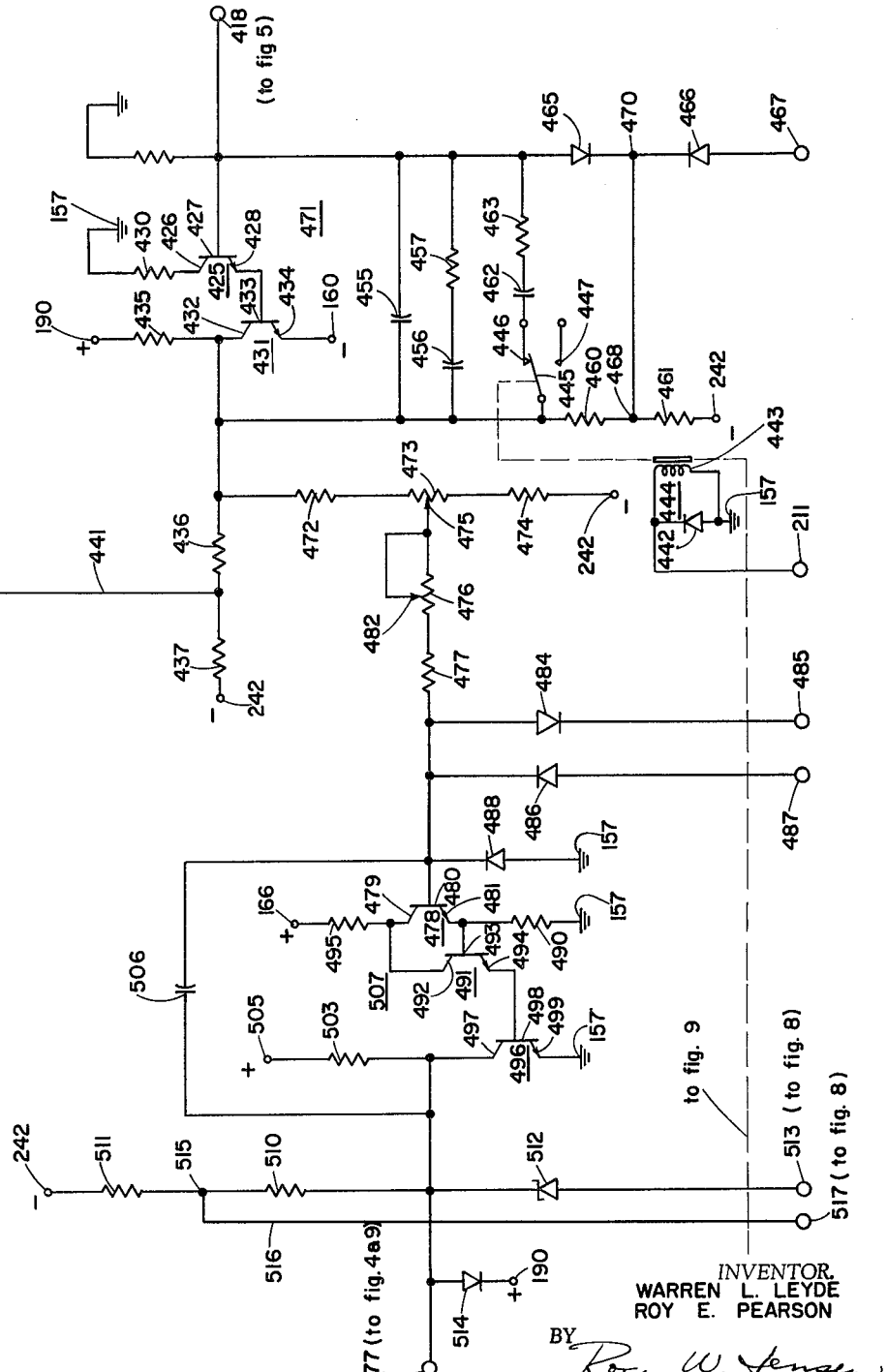

Referring to FIGURE 6 there is shown terminal 418 (see FIGURE 5) directly connected to a base 427 of a transistor 425. Transistor 425 further has a collector 426 and an emitter 428. Collector 426 of transistor 425 is connected by means of a resistor 430 to ground 157. Emitter 428 of transistor 425 is directly connected to a base 433 of a transistor 431. Transistor 431 further has a collector 432 and an emitter 434.

Emitter 434 of transistor 431 is connected directly to the negative potential source 160. Collector 432 of transistor 431 is connected by means of a resistor 435 to the positive potential source 190, and by means of a resistor 436 in series with a resistor 437 to the negative potential source 242. A junction between resistors 436 and 437 is connected to an output terminal 440 by means of a conductor 441. A terminal 211 is connected by means of a relay winding 443 of a relay 444 in parallel with a reverse poled diode 442 to ground 157. Relay 444 further has a movable contact 445, a fixed contact 446, and a fixed contact 447 (see FIGURE 6), a movable contact 450, a fixed contact 451, and a fixed contact 452 (see FIGURE 9).

Collector 432 of transistor 431 is connected by means of a capacitor 455 in parallel with a capacitor 456 in series with a resistor 457 to the base 427 of transistor 425. Collector 432 of transistor 431 is further directly connected to the movable contact 445 of relay 444, and by means of a resistor 460 in series with a resistor 461 to the negative potential source 242. Fixed contact 446 of relay 444 is connected by means of a capacitor 462 in series with a resistor 463 to the base 427 of transistor 425.

Base 427 of transistor 425 is further connected by means of a diode 465 in series with a reverse poled diode 466 to a terminal 467. A junction 468 between resistors 460 and 461 is directly connected to a junction 470 between diodes 465 and 466. Transistors 427 and 441 together with their associated circuitry comprise a first integrating circuit 471.

Collector 432 of transistor 431 is connected by means of a resistor 472, a potentiometer 473, and a resistor 474, to the negative potential source 242. Potentiometer 473 further has a wiper 475 which is connected by means of a potentiometer 476 in series with a resistor 477 to a base 480 of a transistor 478. Transistor 478 further has a collector 479 and an emitter 481. Potentiometer 476 further has a wiper 482 which is connected directly to the wiper 475 of potentiometer 473. Base 480 of transistor 478 is connected by means of a diode 484 to a terminal 485, by means of a reverse poled diode 486 to a terminal 487, and by means of a reverse poled diode 488 to ground 157. Emitter 481 of transistor 478 is connected by means of a resistor 490 to ground 157, and is further directly connected to a base 493 of a transistor 491. Transistor 491 further has a collector 492 and an emitter 494.

Collector 479 of transistor 478 is directly connected to the positive potential source 166 by means of a resistor 495. Collector 492 of transistor 491 is directly connected to collector 479 of transistor 478. Emitter 494 of transistor 491 is directly connected to a base 498 of a transistor 496. Transistor 496 further has a collector 497 and an emitter 499. Emitter 499 of transistor 496 is connected directly to ground 157. Collector 497 of transistor 496 is connected by means of a resistor 503 to a positive source of energizing potential 505, and by means of a capacitor 506 to the base 480 of transistor 478.

Transistors 478, 491, and 496, as well as their associated circuitry comprise a second integrating circuit 507. Collector 497 of transistor 496 is connected by means of a resistor 510 in series with a resistor 511 to the negative potential source 242, by means of a Zener diode 512 to a terminal 513, and by means of a diode 514 to the positive potential source 190. Collector 497 of transistor 496 is further directly connected to terminal 277 (see FIGURE 4).

A junction 515 between resistors 510 and 511 is connected by means of a conductor 516 to a terminal 517.

Figure 7:
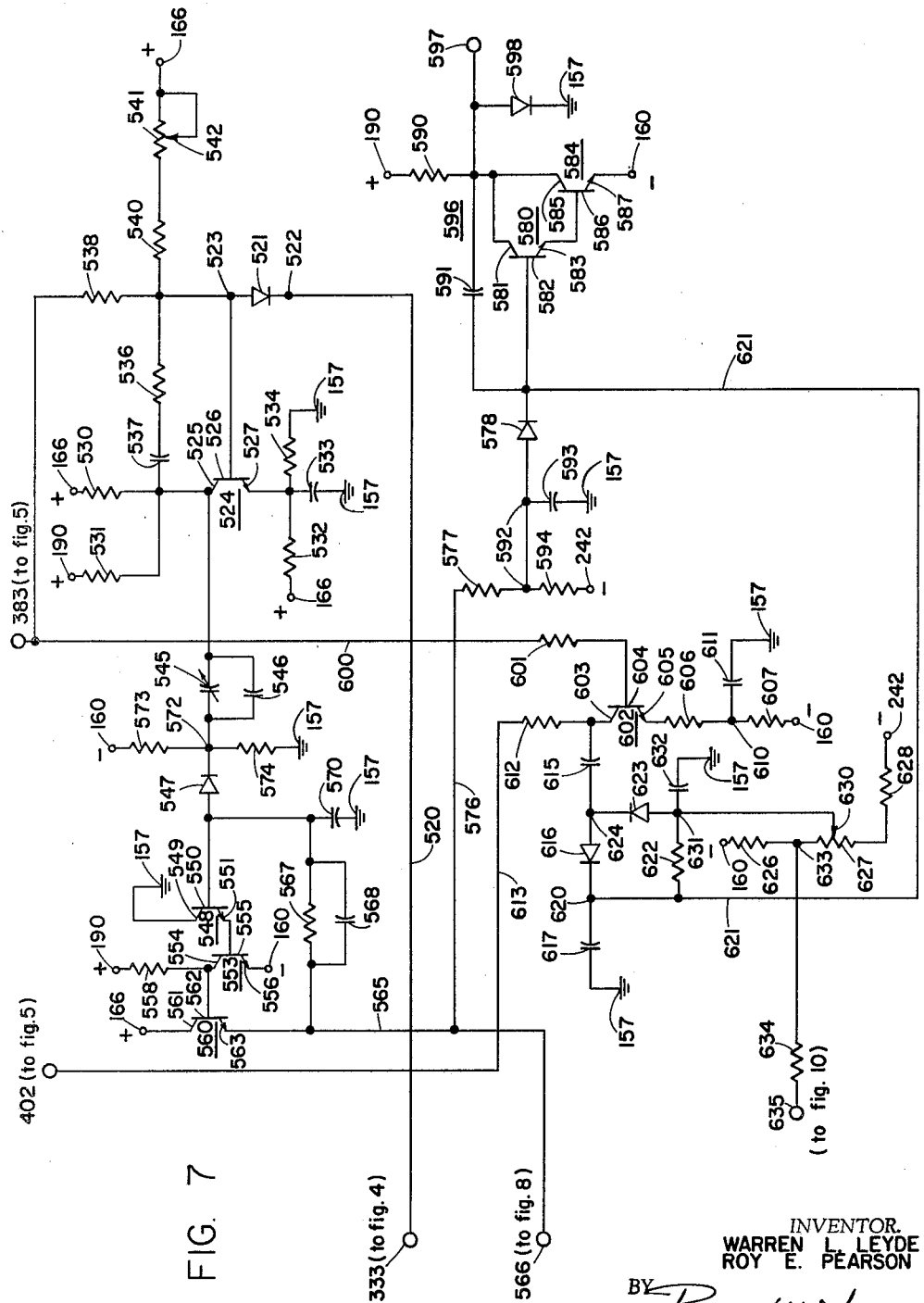

FIGURE 7 shows terminal 333 (see FIGURE 4) connected by means of a conductor 520 to a cathode 522 of a diode 521. Diode 521 further has an anode 523 which is directly connected to a base 526 of a transistor 524. Transistor 524 further has a collector 525 and an emitter 527.

Collector 525 of transistor 524 is connected by means of a resistor 530 to the positive potential source 166, and by means of a resistor 531 to the positive potential source 190. Emitter 527 of transistor 524 is connected by means of a resistor 532 to the positive potential source 166, by means of a capacitor 533 in parallel with a resistor 534 to ground 157.

Anode 523 of diode 521 is connected by means of a resistor 536 in series with a capacitor 537 to the collector 525 of transistor 524, by means of a resistor 538 to terminal 383 (see FIGURE 5), and by means of a resistor 540 in series with a potentiometer 541 to the positive potential source 166. Potentiometer 541 further has a wiper 542 which is connected directly to the positive potential source 166.

Collector 525 of transistor 524 is connected by means of a variable capacitor 545 in parallel with a fixed capacitor 546, and a reverse poled diode 547 to a base 550 of a transistor 548. Transistor 548 further has a collector 549 and an emitter 551.

Collector 549 of transistor 548 is connected directly to ground 157. Emitter 551 of transistor 548 is connected to a base 555 of a transistor 553. Transistor 553 further has a collector 554 and an emitter 556. Emitter 556 of transistor 553 is connected directly to the negative potential source 160. Collector 554 of transistor 553 is connected by means of a resistor 558 to the positive potential source 190, and is further directly connected to a base 562 of a transistor 560. Transistor 560 further has a collector 561 and an emitter 563. The collector 561 of transistor 560 is directly connected to the positive potential source 166. Emitter 563 of transistor 560 is directly connected by means of a conductor 565 to a terminal 566, and by means of a resistor 567 in parallel with a capacitor 568 to the base 550 of transistor 548. Base 550 of transistor 548 is further connected by means of a capacitor 570 to ground 157. A junction 572 between parallel connected capacitors 545 and 546 and diode 547 is connected by means of a resistor 573 to the negative potential source 160, and by means of a resistor 574 to ground 157.

Emitter 563 of transistor 560 is further connected by means of conductor 565, a conductor 576, a resistor 577, and a diode 578 to a base 582 of a transistor 580. Transistor 580 further has a collector 581 and an emitter 583.

Emitter 583 of transistor 580 is directly connected to a base 586 of a transistor 584. Transistor 584 further has a collector 585 and an emitter 587. Emitter 587 of transistor 584 is directly connected to the negative potential source 160. Collector 585 of transistor 584 is directly connected to collector 581 of transistor 580 and is further connected by means of a resistor 590 to the positive potential source 190, and by means of a capacitor 591 to the base 582 of transistor 580. A junction 592 between resistor 577 and diode 578 is connected to ground by means of a capacitor 593, and to the negative potential source 242 by means of a resistor 594.

Transistors 580 and 584 together with their associated circuitry form an integrating circuit 596. Collector 585 of transistor 584 is connected directly to a terminal 597, and by means of a diode 598 to ground 157.

Terminal 383 is connected by means of a conductor 600 in series with a resistor 601 to a base 604 of a transistor 602. Transistor 602 further has a collector 603 and an emitter 605. Emitter 605 of transistor 602 is connected by means of a resistor 606 in series with a resistor 607 to the negative potential source 160. A junction 610 between resistors 606 and 607 is connected by means of a capacitor 611 to ground 157. Collector 603 of transistor 602 is connected by means of a resistor 612 in series with a conductor 613 to terminal 402 (see FIGURE 5).

Collector 603 of transistor 602 is further connected by means of a capacitor 615, a diode 616, and a capacitor 617 to ground 157. The junction 620 between diode 616 and capacitor 617 is connected by means of a conductor 621 to the base 582 of transistor 580, and by means of a resistor 622 in series with a diode 623 to a junction 624 between capacitor 615 and diode 616.

Negative potential source 160 is connected by means of a resistor 626, a potentiometer 627, and a resistor 628, to the negative potential source 242. Potentiometer 627 further has a wiper 630 which is directly connected to a junction 631 between resistor 622 and diode 623. Junction 631 is further connected by means of a capacitor 632 to ground 157.

A junction 633 between resistor 626 and potentiometer 627 is connected by means of the resistor 634 to a terminal 635.

Figure 8:
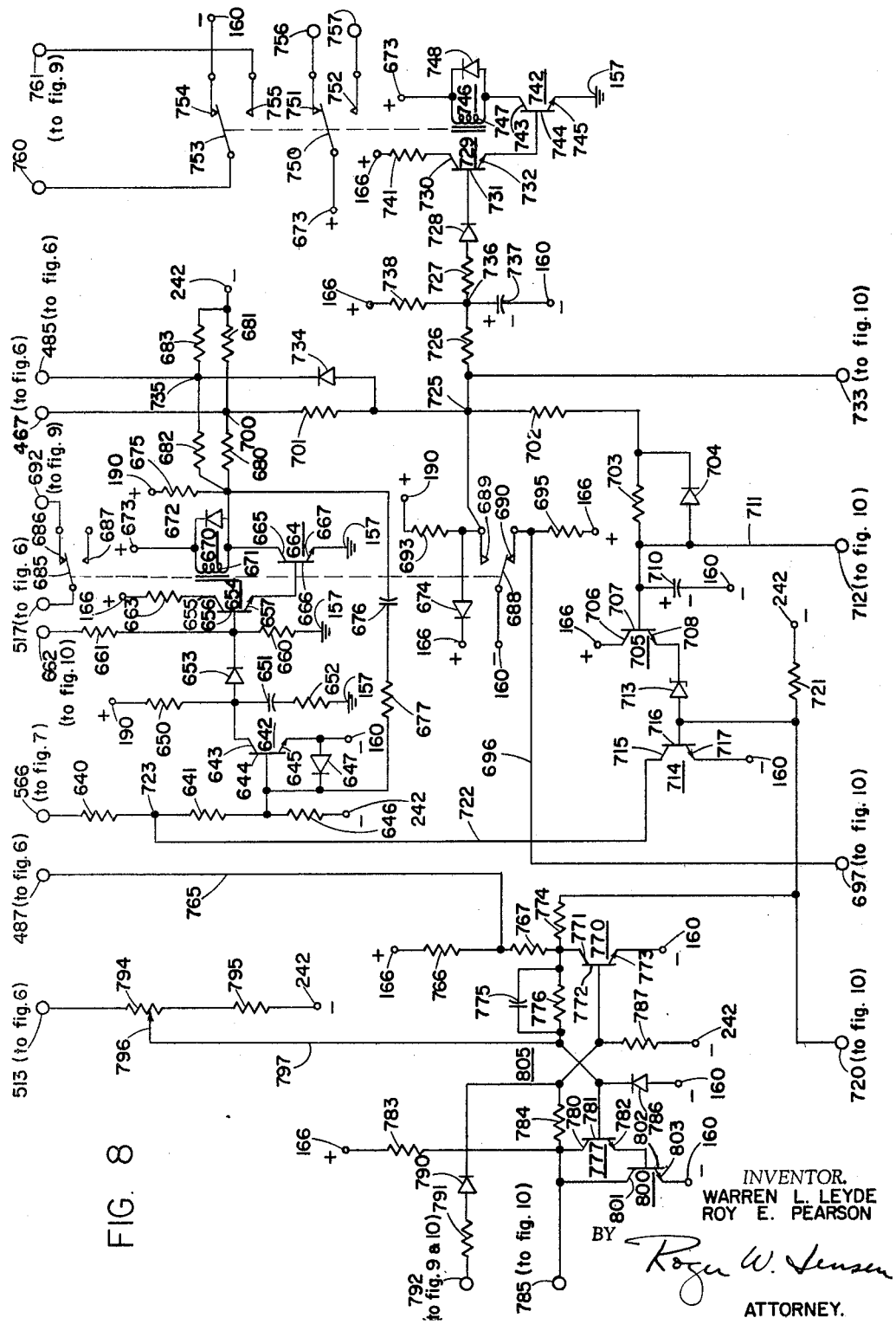

Referring to FIGURE 8 there is shown terminal 566 connected by means of a resistor 640 in series with a resistor 641 to a base 644 of a transistor 642. Transistor 642 further has a collector 643 and an emitter 645. Base 644 of transistor 642 is further connected by means of a resistor 646 to the negative potential source 242, and by means of a reverse poled diode 647 to the negative potential source 160. Emitter 645 of transistor 642 is connected directly to the negative potential source 160. Collector 643 of transistor 642 is connected by means of a resistor 650 to the positive potential source 190, by means of a capacitor 651 in series with a resistor 652 to ground 157, and by means of a diode 653 to a base 656 of a transistor 654. Transistor 654 further has a collector 655 and an emitter 657.

Base 656 of transistor 654 is connected by means of a resistor 660 to ground 157, and by means of a resistor 661 to a terminal 662.

Collector 655 of transistor 654 is connected by means of a resistor 663 to the positive potential source 166. Emitter 657 of transistor 654 is connected directly to a base 666 of a transistor 664. Transistor 664 further has a collector 665 and an emitter 667. Emitter 667 of transistor 664 is connected directly to ground 157.

Collector 665 of transistor 664 is connected by means of a relay winding 671 of a relay 670 in parallel with a diode 672 to a positive source of energizing potential 673.

Collector 665 of transistor 664 is further connected by means of a resistor 675 to the positive potential source 190, by means of a capacitor 676 in series with the resistor 677 to the base 644 of transistor 642, and by a parallel resistive branch to the negative potential source 242, the parallel resistive branch network having a first branch comprising a resistor 680 in series with a resistor 681 and a second branch having a resistor 682 in series with a resistor 683.

Relay 670 has a first movable contact 685 operable to make connection with either a first fixed contact 686 or a second fixed contact 687, and a second movable contact 688 operable to make connection with a first fixed contact 689 or a second fixed contact 690.

Movable contact 685 of relay 670 is directly connected to a terminal 517. Fixed contact 686 of relay 670 is directly connected to a terminal 692. Movable contact 688 of relay 670 is connected directly to the negative potential source 160. Fixed contact 689 of relay 670 is connected by means of a resistor 693 to the positive potential source 190 and by means of a diode 694 to the positive potential source 166. Fixed contact 690 of relay 670 is connected by means of a resistor 695 to the positive potential source 166, and by means of a conductor 696 to a terminal 697.

A junction 700 between resistors 680 and 681 is connected directly to terminal 467 (see FIGURE 6), and by means of a resistor 701, a resistor 702, and a resistor 703 in parallel with a reverse poled diode 704 to a base 707 of a transistor 705. Transistor 705 further has a collector 706 and an emitter 708. Collector 706 of transistor 705 is directly connected to the positive potential source 166. Base 707 of transistor 705 is connected by means of a capacitor 710 to the negative potential source 160, and by means of a conductor 711 to a terminal 712.

Emitter 708 of transistor 705 is connected by means of a Zener diode 713 to a base 716 of a transistor 714. Transistor 714 further has a collector 715 and an emitter 717. Base 716 of transistor 714 is connected directly to a terminal 720, and by means of a resistor 721 to the negative potential source 242. Emitter 717 of transistor 714 is directly connected to the negative potential source 160. Collector 715 of transistor 714 is connected by means of a conductor 722 to a junction 723 between resistors 640 and 641.

A junction 725 between resistors 701 and 702 is connected directly to fixed contact 689 of relay 670, and by means of a resistor 726, a resistor 727, and a diode 728 to a base 731 of a transistor 729. Transistor 729 further has a collector 730 and an emitter 732. Terminal 725 is further directly connected to a terminal 733, and by means of a diode 734 to a junction 725 between resistors 682 and 683. Junction 735 is further directly connected to terminal 485. A junction 736 between resistors 726 and 727 is connected by means of a capacitor 737 to the negative potential source 160, and by means of a resistor 738 to the positive potential source 166.

Collector 730 of transistor 729 is connected by means of a resistor 741 to the positive potential source 166. Emitter 732 of transistor 729 is connected directly to a base 744 of a transistor 742. Transistor 742 further has a collector 743 and an emitter 745.

Emitter 745 of transistor 742 is directly connected to ground 157. Collector 743 of transistor 742 is connected by means of a relay winding 747 of a relay 746 in parallel with a diode 748 to the positive potential source 673. Relay 746 further has a movable contact 750 operable to engage either a first fixed contact 751 or a second fixed contact 752, and a second movable contact 753 operable to engage either a first fixed contact 754 or a second fixed contact 755. Movable contact 750 is connected directly to the positive potential source 673. Fixed contact 751 of relay 746 is connected directly to a terminal 756, while fixed contact 752 of relay 746 is connected to a terminal 757.

Movable contact 753 of relay 746 is directly connected to a terminal 760, while fixed contact 755 is directly connected to a terminal 761. Fixed contact 754 of relay 746 is directly connected to the negative potential source 160.

Terminal 487 (see FIGURE 6) is connected by means of a conductor 765 in series with a resistor 766 to the positive potential source 166, and by means of conductor 765 in series with a resistor 767 to a collector 771 of a transistor 770. Transistor 770 further has a base 772 and an emitter 773. Emitter 773 of transistor 770 is directly connected to the negative potential source 160. Collector 771 of transistor 770 is further connected by means of a resistor 774 to terminal 720, and by means of a capacitor 775 in parallel with a resistor 776 to a base 781 of a transistor 777. Transistor 777 further has a collector 780 and an emitter 782. Collector 780 of transistor 777 is connected by means of a resistor 783 to the positive potential source 166, and by means of a resistor 784 to the base 772 of transistor 770. Collector 780 of transistor 777 is further connected directly to a terminal 785. Base 781 of transistor 777 is connected by means of a reverse poled diode 786 to the negative potential source 160. Base 772 of transistor 770 is connected by means of a resistor 787 to the negative potential source 242, and by means of a reverse poled diode 790 in series with a resistor 791 to a terminal 792.

Terminal 513 (see FIGURE 6) is connected by means of a potentiometer 794 in series with a resistor 795 to the negative potential source 242. Potentiometer 794 further has a wiper 796 which is connected by means of a conductor 797 to the base 781 of transistor 777.

Emitter 782 of transistor 777 is directly connected to a base 802 of a transistor 800. Transistor 800 further has a collector 801 and an emitter 803. Emitter 803 of transistor 800 is directly connected to the negative potential source 160, while the collector 801 of transistor 800 is directly connected to the collector 780 of transistor 777.

Transistors 770, 777 and 800, along with their associated circuitry, comprise a multivibrator circuit 805.

Figure 9:
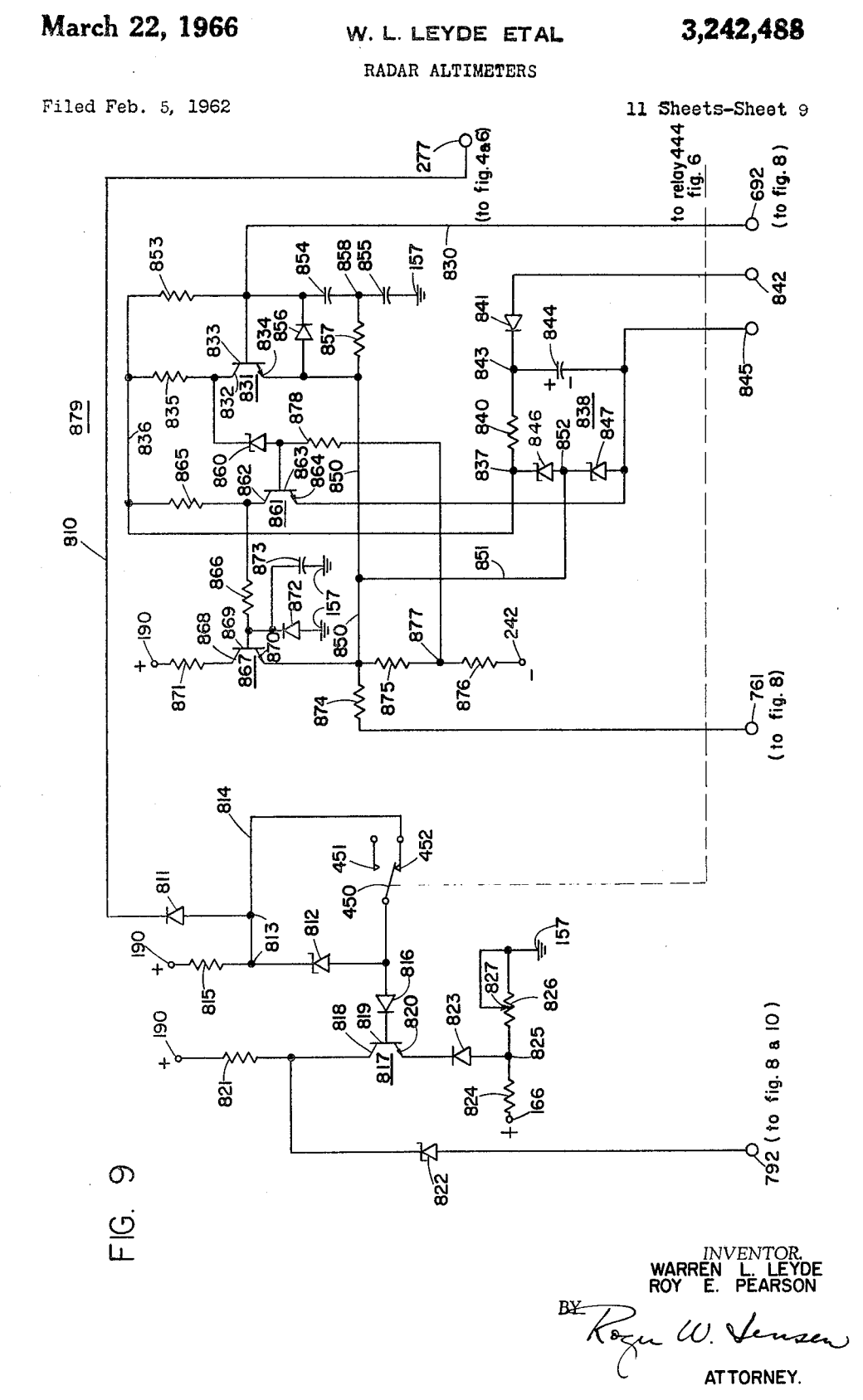

Referring to FIGURE 9, terminal 277 is connected by means of a conductor 810, a reverse poled diode 811, and a Zener diode 812 to movable contact 450 of relay 444. A junction 813 between diode 811 and Zener diode 812 is connected by means of a conductor 814 to fixed contact 452 of relay 444, and by means of a resistor 815 to the positive potential source 190.

Movable contact 450 of relay 444 is further connected by means of a diode 816 to a base 819 of a transistor 817. Transistor 817 further has a collector 818 and an emitter 820. Collector 818 of transistor 817 is connected by means of a resistor 821 to the positive potential source 190, and by means of a Zener diode 822 to terminal 792. Emitter 820 of transistor 817 is connected by means of a reverse poled diode 823 in series with a resistor 824 to the positive potential source 166. A junction 825 between diode 823 and resistor 824 is connected by means of a potentiometer 826 to ground 157. Potentiometer 826 further has a wiper 827 which is connected to ground 157.

Terminal 692 (see FIGURE 8) is connected by means of a conductor 830 to a base 833 of a transistor 831. Transistor 831 further has a collector 832 and an emitter 834.

Collector 832 of transistor 831 is connected by means of a resistor 835 and a conductor 836 to a positive terminal 837 of a power supply 838. Terminal 837 is connected by means of a resistor 840 in series with a reverse poled diode 841 to a terminal 842. A junction 843 between resistor 840 and diode 841 is connected by means of a capacitor 844 to a terminal 845.

Terminal 837 is further connected by means of a Zener diode 846 in series with a Zener diode 847 to terminal 845. Terminals 842 and 845 are adapted to be connected to a source of alternating energizing potential.

Emitter 834 of transistor 831 is connected by means of a conductor 850 and a conductor 851 to a junction 852 between Zener diodes 846 and 847. Base 833 of transistor 831 is connected by means of a resistor 853 to conductor 836, and by means of a capacitor 854 in series with a capacitor 855 to ground 157. Emitter 834 of transistor 831 is connected by means of a diode 856 to the base 833 of transistor 831, and by means of a resistor 857 to a junction 858 between capacitors 854 and 855.

Collector 832 of transistor 831 is connected by means of a Zener diode 860 to a base 863 of a transistor 861. Transistor 861 further has a collector 862 and an emitter 864. Emitter 864 of transistor 861 is connected directly to terminal 845. Collector 862 of transistor 861 is connected by means of a resistor 865 to conductor 836, and by means of a resistor 866 to a base 869 of a transistor 867. Transistor 867 further has a collector 868 and an emitter 870. Collector 868 of transistor 867 is connected by means of a resistor 871 to the positive potential source 190. Base 869 of transistor 867 is connected to ground 157 by means of a reverse poled diode 872 in parallel with a capacitor 873. Emitter 870 of transistor 867 is connected by means of a resistor 874 to terminal 761, and by means of a resistor 875 in series with the resistor 876 to the negative potential source 242. A junction 877 between resistor 875 and resistor 876 is connected by means of a resistor 878 to the base 863 of transistor 861.

Transistors 831, 861 and 867 along with their associated circuitry, form a smoother circuit 879.

Figure 10:
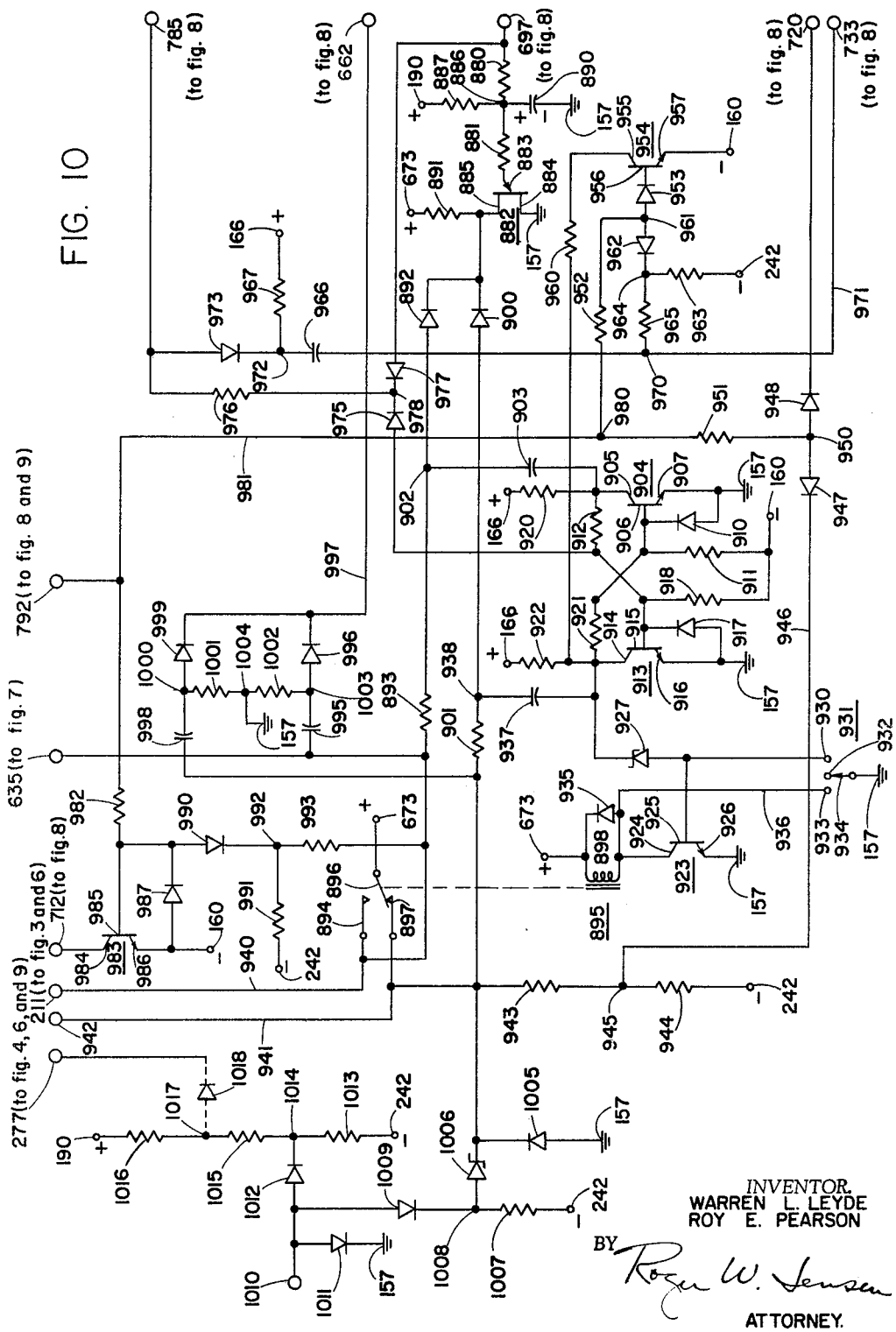

Referring to FIGURE 10 there is shown terminal 697 connected by means of a resistor 880 in series with a resistor 881 to an emitter 883 of a unijunction transistor 882. Unijunction transistor 882 further has a first base 884 and a second base 885. Base 884 of unijunction transistor 882 is connected directly to ground 157.

A junction 886 between resistors 880 and 881 is connected by means of a resistor 887 to the positive potential source 190, and by means of a capacitor 890 to ground 157. Base 885 of unijunction transistor 882 is connected by means of a resistor 891 to the positive potential source 673, and by means of a reverse poled diode 892 in series with a resistor 893 to a fixed contact 894 of a relay 895. Relay 895 further has a movable contact 896 and a fixed contact 897, and a winding 898.

Base 885 of unijunction transistor 882 is further connected by means of a reverse poled diode 900 in series with a resistor 901 to fixed contact 897 of relay 895. Movable contact 896 of relay 895 is directly connected to the positive potential source 673.

A junction 902 between diode 892 and resistor 893 is connected by means of a capacitor 903 to a collector 905 of a transistor 904. Transistor 904 further has a base 906 and an emitter 907. Emitter 907 of transistor 904 is connected directly to ground 157. Base 906 of transistor 904 is connected to ground 157 by means of a reverse poled diode 910 and to the negative potential source 160 by means of a resistor 911. Collector 905 of transistor 904 is connected by means of a resistor 912 to a base 915 of a transistor 913. Transistor 913 further has a collector 914 and an emitter 916. Emitter 916 of transistor 913 is connected directly to ground 157. Base 915 of transistor 913 connected to ground by means of a reverse poled diode 917, and to the negative potential source 160 by means of a resistor 918. Collector 905 of transistor 904 is connected to the positive potential source 166 by means of a resistor 920.

Collector 914 of transistor 913 is connected to the base 906 of transistor 904 by means of a resistor 921, to the positive potential source 166 by means of a resistor 922, and to the base 925 of a transistor 923 by means of a reverse poled diode 927. Transistor 923 further has a collector 924 and an emitter 926. Emitter 926 of transistor 923 is connected directly to ground 157. Base 925 of transistor 923 is connected to a fixed contact 930 of a switch 931. Switch 931 further has a fixed contact 932 and a fixed contact 933, and a movable contact 934. Movable contact 934 of switch 931 is connected directly to ground 157. Collector 924 of transistor 923 is connected by means of winding 898 in relay 895 in parallel with a diode 935 to the positive potential source 673, and by means of a conductor 936 to fixed contact 933 of switch 931.

Collector 914 of transistor 913 is further connected by means of a capacitor 937 to a junction 938 between diode 900 and resistor 901.

Fixed terminal 894 of relay 895 is connected by means of a conductor 940 to terminal 211. Fixed terminal 897 of relay 895 is connected by means of a conductor 941 to a terminal 942, and by means of a resistor 943 in series with a resistor 944 to the negative potential source 242. A junction 945 between resistors 943 and 944 is connected by means of a conductor 946, a reverse poled diode 947, and a diode 948 to terminal 720. A junction 950 between diodes 947 and 948 is connected by means of a resistor 951, a resistor 952, and a diode 953 to a base 956 of a transistor 954. Transistor 954 further has a collector 955 and an emitter 957. Emitter 957 of transistor 954 is directly connected to the negative potential source 160. Collector 955 of transistor 954 is connected by means of a resistor 960 to the collector 914 of transistor 913. A junction 961 between resistor 952 and diode 953 is connected by means of a diode 962 in series with a resistor 963 to the negative potential source 942. A junction 964 between diode 962 and resistor 963 is connected by means of a resistor 965, a capacitor 966, and a resistor 967 to the positive potential source 166. A junction 970 between resistor 965 and capacitor 966 is connected by means of a conductor 971 to terminal 733. A junction 972 between capacitor 966 and resistor 967 is connected by means of a reverse poled diode 973 to terminal 785.

Base 915 of transistor 913 is connected by means of a diode 975 in series with a resistor 976 to terminal 785. Terminal 697 is connected by means of a diode 977 to a junction 978 between diode 975 and resistor 976.

A junction 980 between resistors 951 and 952 is connected by means of a conductor 981 to terminal 792. Terminal 792 is further connected by means of a resistor 982 to a base 985 of a transistor 983. Transistor 983 further has a collector 984 and an emitter 986. Emitter 986 of transistor 983 is directly connected to the negative potential source 160, and by means of a diode 987 to the base 985 of transistor 983. Collector 984 of transistor 983 is directly connected to terminal 712.

Base 985 of transistor 983 is connected by means of a diode 990 in series with a resistor 991 to the negative potential source 242. A junction 992 between diode 990 and resistor 991 is connected by means of a resistor 993 to the fixed contact 894 of relay 895.

Fixed contact 894 of relay 895 is further connected directly to terminal 635, and by means of a capacitor 995 in series with a diode 996 and a conductor 997 to terminal 662. Fixed contact 897 of relay 895 is connected by means of a capacitor 998, a diode 999, and conductor 997 to terminal 662. A junction 1000 between capacitor 998 and diode 999 is connected by means of a resistor 1001 in series with a resistor 1002 to a junction 1003 between capacitor 995 and diode 996. A junction 1004 between resistor 1001 and resistor 1002 is connected to ground 157.

Fixed contact 897 of relay 895 is connected by means of a reverse poled diode 1005 to ground 157, and by means of a Zener diode 1006 in series with a resistor 1007 to the negative potential source 242. A junction 1008 between Zener diode 1006 and resistor 1007 is connected by means of a reverse poled diode 1009 to a terminal 1010. Terminal 1010 is further connected to ground 157 by means of a diode 1011, and by means of a diode 1012 in series with a resistor 1013 to the negative potential source 242. A junction 1014 between diode 1012 and resistor 1013 is connected by means of a resistor 1015 in series with a resistor 1016 to the positive potential source 190. A junction 1017 between resistor 1015 and resistor 1016 is connected by means of a diode 1018 to terminal 277.

*Operation of FIGURES 3–10*

As pointed out previously in conjunction with the explanation of the block diagram of FIGURE 1, when the transmitter fires, a timing signal is coupled from the output of the transmitter to an input of the altitude tracking unit.

Referring to FIGURE 3, the positive timing pulse from the radar transmitter appears at terminal 150 and is coupled through capacitor 151 to the base 154 of transistor 152. The positive signal on the base 154 of transistor 152 causes the conduction of transistor 152 to increase. The conduction path for transistor 152 is from the positive potential source 166 through resistor 165, collector 153 to emitter 155 of transistor 152, resistor 161, and resistor 162 to the negative potential source 160. The increase in conduction of transistor 152 causes its collector 153 to move in the negative direction and this negative going signal is coupled through diode 167 to the base 172 of the normally conducting transistor 170, thereby shutting off transistor 170 and causing the emitter 173 of transistor 170 to go negative.

When transistor 170 cuts off, the potential at its collector 171 goes positive and this positive going signal is coupled through capacitor 176 and resistor 180 to the base 183 of normally off transistor 181. The positive signal on the base 183 of transistor 181 causes this transistor to conduct. The conduction path for transistor 181 is from the positive potential source 190 through resistor 187, Zener diode 186, collector 182 to emitter 184 of transistor 181, and resistor 191 to the negative potential source 160. When transistor 181 conducts, its collector 182 goes negative and this negative signal is coupled to the base 172 of transistor 170 thereby holding transistor 170 in an off condition.

As explained previously, when transistor 170 cuts off, its emitter 173 goes negative and this substantially rectangular wave negative signal is coupled through diode 201, diode 202, and resistor 203 to the base 206 of transistor 204 of the sawtooth generating circuit 240. Sawtooth generating circuit 240 is an integrating circuit, and since the input to this integrator is substantially a negative rectangular wave, the output appearing on the collector 205 of transistor 204 will be a positive ramp, or sawtooth, signal. This sawtooth signal is coupled to terminal 220.

Referring to FIGURE 4, the sawtooth signal appearing on terminal 220 is coupled through capacitor 245 to the anode 246 of comparator 247. The output of integrator 507 (see FIGURE 6) is coupled from terminal 277 through resistor 276 to the cathode 248 of comparator diode 247. This signal from the output of integrator 507 is a D.C. level proportional to aircraft altitude.

When the instantaneous value of the sawtooth signal on the anode 246 of diode 247 is equal to the D.C. level from the output of integrator 507 on the cathode of diode 247, diode 247 will conduct and a pulse will appear on its cathode 248. This pulse will be differentiated twice by means of capacitor 280 and resistor 281 and capacitor 283 and resistor 284, and a positive spike will appear at junction 286. Diode 285 is a clipping circuit which removes the negative spike from the output of the differentiators. The positive spike at junction 286 will be coupled through capacitor 287, secondary winding 292 of transformer 291, and resistor 296 to the base 299 of transistor 297, thereby causing transistor 297 to conduct. The conduction path for transistor 297 is from the positive potential source 166 through resistor 303, primary winding 293 of transformer 291, and collector 298 to emitter 300 of transistor 297 to ground 157. The conduction of transistor 297 through primary winding 293 of transformer 291 induces a signal in the secondary winding 292 of transformer 291 of a polarity such that the base 299 of transistor 297 is positive with respect to its emitter 300 and hence transistor 297 remains in conduction. When transistor 297 saturates, the magnetic field in transformer 291 collapses and the collapsing field induces a signal in secondary winding 292 of a polarity such that base 299 of transistor 297 is negative with respect to its emitter 300 and hence transistor 297 cuts off.

The current flow through primary winding 293 of transformer 291 further induces a pulse in secondary winding 294 of transformer 291 and a pulse in secondary winding 295 of transformer 291. The pulse induced in secondary winding 294 is coupled to the base 318 of transistor 316 and is of a polarity such that base 318 is positive with respect to the emitter 319 of transistor 316, thereby causing transistor 316 to conduct. The conduction path for transistor 316 is from the positive potential source 166 through resistor 336, collector 317 to emitter 319 of transistor 316, and resistor 341 to ground 157. Transistor 316 is an emitter follower and its conduction produces a positive pulse on the emitter 319 which is coupled to terminal 340. The pulse at terminal 340 is the track pulse.

The pulse induced in secondary winding 295 of transformer 291 is coupled through diode 321 and through delay line 330 to the base 325 of transistor 322, and is of a polarity such that base 325 is positive with respect to emitter 324 of transistor 322 and hence transistor 322 will conduct. The conduction path for transistor 322 is from the positive potential source 166 through resistor 336, conductor 335, collector 323 to emitter 324 of transistor 322, and resistor 334 to ground 157. Transistor 322 is also an emitter follower and hence the conduction of this transistor causes a positive pulse to appear on its emitter 324. This positive pulse is coupled to terminal 333 and constitutes the track automatic gain control (TAGC) gate. Since the pulse induced in secondary winding 295 of transformer 291 was applied directly through diode 321 to the base 325 of transistor 322, and was also delayed in delay line 330, the trailing edge of the TAGC gate will be delayed in time with respect to the trailing edge of the track gate by a predetermined amount.

The conduction of transistor 297 through primary winding 293 of transistor 291 and resistor 303 causes junction 304 to move in a negative direction and this negative going signal is coupled through conductor 308 to terminal 196. Referring again to FIGURE 3, the negative going signal at terminal 196 is coupled through capacitor 195 and diode 194 to the base 183 of transistor 181, thereby cutting off transistor 181. When transistor 18 cuts off its collector 182 goes positive and this positive signal is coupled to the base 172 of transistor 170 thereby returning transistor 170 to its conducting state.

As previously described in conjunction with the explanation of the block diagram of FIGURE 1, the output of the IF amplifier and full wave detector of the receiver unit is coupled to the input of a video amplifier. Referring to FIGURE 5, the negative video input signal appears at terminal 345 and is coupled through capacitor 348 to the base 352 of transistor 350, thereby decreasing the conduction of transistor 350. This decrease in conduction of transistor 350 causes its collector 351 to go more positive and this positive going signal is coupled through capacitor 366 to the base 369 of transistor 367, thereby increasing the conduction of transistor 367. Transistor 367 is an emitter follower, and therefore the increase in conduction of transistor 367 causes its emitter 370 to go more positive. This positive going signal on the emitter 370 of transistor 367 is coupled through resistor 384 to the anode of coincident diode 391.

The track gate from the emitter of transistor 316 (see FIGURE 4) is coupled from terminal 340 to the cathode of coincident diode 391. When the track gate is not present the video signal on the anode of coincident diode 391 will be substantially shorted to ground. However, when the track gate is present, coincident diode 391 will be back biased and the video signal will be coupled through diode 385 to the base 388 of transistor 386, thereby causing transistor 386 to conduct. When transistor 386 conducts, a positive signal appears on its emitter 389 and this positive signal is coupled to the base 406 of transistor 404 causing transistor 404 to conduct. The conduction path for transistor 404 is from the positive potential source 190 through resistor 413, collector 405 to emitter 407 of transistor 404 to ground. When transistor 404 conducts, a negative signal appears on its collector 405 and this negative signal is coupled through resistor 415 and capacitor 416 to the input of a fast-time integrator. The fast-time integrator comprises diode 417, capacitor 419, and resistors 422 and 423. The output of the fast-time integrator is coupled to terminal 418.

Referring to FIGURE 6, the output of the fast-time integrator is coupled from terminal 418 to the base 427 of transistor 425 at the input of integrator circuit 471. The signal at the input to integrator 471 is proportional to altitude acceleration; this signal is integrated in integrator 471 and a signal proportional to altitude rate appears on the collector 432 of transistor 431. This altitude rate signal is coupled through resistor 436 and conductor 441 to terminal 440. Terminal 440 is adapted to be connected to an indicator unit, such as a meter, calibrated to indicate altitude rate. The altitude rate signal is also coupled through resistor 472, potentiometer 473, potentiometer 476, and resistor 477 to the base 480 of transistor 478 at the input of integrator circuit 507. The altitude rate signal is integrated in integrator 507 and a signal proportional to altitude appears on the collector 497 of transistor 496 and is coupled to terminal 277, and through resistor 510 and conductor 516 to terminal 517.

As explained previously, the altitude signal is coupled from terminal 277 through resistor 276 to the cathode 248 of comparator diode 247 (see FIGURE 4).

Referring again to FIGURE 5, the video signal appearing on the emitter 370 of transistor 367 is coupled through conductor 382 to terminal 383. Referring now to FIGURE 7 the video signal at terminal 383 is coupled through resistor 538 to the anode 523 of coincident diode 521.

The TAGC gate appearing on the emitter 324 of transistor 322 (see FIGURE 4) is coupled to terminal 333, and from terminal 333 through conductor 520 (see FIGURE 7) to the cathode 522 of coincident diode 521. When the TAGC pulse is not present the video pulse appearing at the anode 523 of coincident diode 521 is substantially shorted to ground. However, when the TAGC pulse is present at the cathode 522 of coincident diode 521 the coincident diode will be back biased and the video pulse will be coupled to the base 526 of transistor 524.

As explained previously, the trailing edge of the TAGC gate is delayed, thereby increasing the pulse width of the TAGC gate. The purpose of this wide pulse width is to insure that the TAGC gate will track substantially the entire period of the video pulse. In other words, the TAGC pulse applied to the cathode 522 of coincident diode 521 will back bias diode 521 during the entire time of the video pulse.

The positive video pulse applied to the base 526 of transistor 524 causes the conduction of transistor 524 to increase and thereby results in a negative going signal appearing at the collector 525 of transistor 524. This negative going signal is coupled through parallel connected capacitors 545 and 546, and diode 547 to the base 550 of transistor 548. Parallel connected capacitors 545 and 546 form part of a peak sensing network, and therefore the signal applied to the base 550 of transistor 548 is proportional to variations in the peak amplitude of the video signal.

The signal at the base 550 of transistor 548 will be integrated in transistors 548, 553, 560 and feedback capacitor 568 and an output signal will appear at the emitter 563 of transistor 560. This signal will be coupled through conductor 565, conductor 576, resistor 577, and diode 578 to the base 582 of transistor 580 at the input of the automatic gain control (AGC) integrator 596. The output of the AGC integrator at the collector 585 of transistor 584 will be coupled to terminal 597. Terminal 597 is adapted to be connected to the receiver IF strip so as to control the gain of the IF amplifier and thereby maintain the amplitude of the video pulses substantially constant. This is necessary since changes in the amplitude of the video signal will affect the leading edge of the video signal, and since the track gate is tracking the leading edge, an altitude error will occur if the amplitude of the video pulse changes.

The video output line, or bus, at the emitter 370 of transistor 367 (see FIGURE 5) is also connected from terminal 383 through conductor 600 (see FIGURE 7) and resistor 601 to the base 604 of transistor 602. Transistor 602 and its associated circuitry form a noise automatic gain control (NAGC) circuit. Furthermore, terminal 376 (see FIGURE 5) in the power circuit of video amplifier 359 is connected by means of conductor 375 to terminal 402. Terminal 402 is further connected by means of conductor 613 (see FIGURE 7) and resistor 612 to the collector 603 of transistor 602 of the NAGC circuit. The NAGC circuit is designed so that it will ignore the relatively fast occurring video pulses themselves but will respond to any relatively slow occurring variations in the noise level on the video bus.

For instance, assume that the noise level on the video bus increased, thereby resulting in an increase in the signal being coupled through conductor 600 and resistor 601 to the base 604 of transistor 602. This increase in the video noise level will change the conduction of transistor 602 and result in a change in the potential on the collector 603 of transistor 602. This change in collector potential would be coupled through capacitor 615 to the base 582 of the automatic gain control integrator 596, where it would be integrated and applied to the receiver IF strip to decrease the noise level from the receiver output. Similarly, if the noise level on the video bus decreased, this decrease would change the conduction of transistor 602 of the NAGC circuit which would result in a change of the collector potential on collector 603 of transistor 602. This change in collector potential would be coupled to the base 582 of transistor 580 of the AGC integrator circuit 596 and, in this case, the output of the AGC integrator would be coupled to the IF amplifier in the receiver tending to increase the noise level of the receiver output. From this operation it can be seen that the NAGC circuit tends to hold the noise level of the receiver and video amplifier substantially constant.

The signal on the emitter 563 of transistor 560 is coupled through conductor 565 to terminal 566.

Referring to FIGURE 8 the signal at terminal 566 is coupled through resistors 640 and 641 to the base 644 of transistor 642, thereby causing transistor 642 to conduct. The conduction path of transistor 642 is from the positive potential source 190 through resistor 650, and collector 643 to emitter 645 of transistor 642 to the negative potential source 160. The conduction of transistor 642 causes its collector 643 to go negative and this negative signal is coupled through diode 653 to the base 656 of transistor 654 thereby cutting off transistor 654. When transistor 654 cuts off it effectively opens the base circuit to transistor 664 thereby cutting off transistor 664 and deenergizing relay 670. When relay 670 is deenergized movable contact 685 makes contact with fixed contact 686 while movable contact 688 makes contact with fixed contact 690.

With movable contact 685 in contact with fixed contact 686, terminal 517 from the output of integrator circuit 507 (see FIGURE 6) will be connected to terminal 692 at the input of smoother circuit 879 (see FIGURE 9).

When transistor 664 cuts off, the voltage at its collector 665 rises and this increase in potential is coupled through resistor 680 to terminal 467. The positive potential at terminal 467 biases diode 466 (see FIGURE 6) to its conducting state and a current flows from terminal 467 through diode 466 and resistor 461 to the negative potential source 242. Since diode 466 is conducting, the potential at junction 470 rises to approximately the positive potential at terminal 467 and hence diode 465 is back biased, thereby enabling the input to integrator circuit 471.

Similarly, the increased positive potential on the collector 665 of transistor 664 is coupled through resistor 682 to terminal 485. The positive potential at terminal 485 back biases diode 484 (see FIGURE 6) and holds this diode in a nonconducting state.

When transistor 664 is off and relay 670 is deenergized, fixed relay contact 689 will be at a positive potential and this potential will be coupled through resistor 726, resistor 727, and diode 728 to the base 731 of transistor 729 thereby causing transistor 729 to conduct. The conduction path for transistor 729 is from the positive potential source 166 through resistor 741, collector 730 to emitter 732 of transistor 729, base 744 to emitter 745 of transistor 742 to ground 157. The base emitter flow through transistor 742 switches transistor 742 to its conducting state and a current flows from the positive potential source 673 through relay winding 747 of relay 746 and collector 743 to emitter 745 of transistor 742 to ground 157. The current flow through winding 747 of relay 746 energizes the relay and closes the relay contacts such that movable contact 753 is in engagement with fixed contact 755, thereby connecting terminal 760 directly to terminal 761. Terminal 760 is adapted to be connected to an altitude indicating device, such as a meter, calibrated to indicate altitude. Terminal 761 is connected through resistor 874 (see FIGURE 9) to the emitter 870 of transistor 867 at the output of the smoother circuit 879.

During the tracking operation, transistor 770 of the recycle multivibrator 805 is normally conducting while transistors 777 and 800 of recycle multivibrator 805 are normally cut off. When transistor 770 conducts, a current flows from the positive potential source 166 through resistor 766, resistor 767, and collector 771 to emitter 773 of transistor 770 to the negative potential source 160, and the conductor 765 at the junction between resistors 766 and 767 goes negative. This negative signal is coupled through conductor 765 to terminal 487, and from terminal 487 to the anode of diode 486 (see FIGURE 6) thereby back biasing diode 486 and holding this diode in its nonconducting state.

*Altimeter search mode*

The search operation of the altimeter, which is necessary when the altimeter is first energized or in the event that the track gate loses the video pulse, will now be explained.

If the track gate loses the video pulse, or in other words, if there is no coincidence between the video pulse supplied to the anode of coincident diode 391 (see FIGURE 5) and the track gate applied from terminal 390 to the cathode of coincident diode 391, then diode 391 will conduct and substantially short out the video pulse. With the video signal removed from the base 526 of transistor 524 (see FIGURE 7), this transistor decreases conduction and the potential at its collector 525 rises. This increase in potential is coupled through capacitors 545 and 546 and diode 547 to the base 550 of transistor 548 thereby increasing the conduction of transistor 548. The increase in conduction of transistor 548 results in an increase in conduction of transistor 553 and hence the potential at the collector 554 of transistor 553 goes negative. This negative signal is coupled to the base 562 of transistor 560 thereby cutting off transistor 560.

When transistor 560 cuts off, the potential on the base 644 of transistor 642 (see FIGURE 8) goes negative and cuts off transistor 642. When transistor 642 cuts off, the potential at its collector 643 tends to go positive and this positive potential is coupled through diode 653 to the base 656 of transistor 654 thereby causing transistor 654 to conduct. However, it will be noted that there is a delay in the time between the cutoff of transistor 642 and the conduction of transistor 654 due to the fact that capacitor 651 must charge before the potential on the collector 643 of transistor 642 goes positive.

When transistor 654 conducts, a current flows from the positive potential source 166 through resistor 663, collector 655 to emitter 657 of transistor 654, and base 666 to emitter 667 of transistor 664 to ground 157. The base to emitter flow of transistor 664 turns this transistor to its conducting state and hence a current flows from the positive potential source 673 through winding 671 of relay 670 and collector 665 to emitter 667 of transistor 664 to ground 157. This current flow through winding 671 of relay 670 energizes this relay and moves the movable contact 685 into engagement with fixed contact 687, and moves movable contact 688 into engagement with fixed contact 689.

The delay between the cutoff of transistor 642 and the conduction of transistor 654 is necessary in order to prevent a momentary loss of coincidence between the track gate and the video pulse from energizing relay 670 and thereby switching the altimeter from its track mode to its search mode.

The energization of relay 670 and the breaking of the contact between movable contact 685 and fixed contact 686 opens the circuit between terminal 517 and terminal 692 and removes the input to the smoother circuit from the output of integrator 507. The engagement of movable contact 688 with fixed contact 689, upon energization of relay 670, connects the negative potential source 160 to junction 725, and this negative potential is coupled through resistor 726 to junction 736 thereby discharging capacitor 737. When capacitor 737 has discharged, diode 728 will become back biased or nonconductive and the base circuit of transistor 729 will be effectively opened and hence transistor 729 will cease conducting. When transistor 729 shuts off, it effectively opens the base circuit of transistor 742 and hence transistor 742 will also shut off thereby deenergizing relay 746. When relay 746 deenergizes, the connection between movable contact 753 and fixed contact 755 is broken and hence the altitude indicator is removed from the output of the smoother circuit. The discharge of capacitor 737 provides a delay which prevents the deenergization of relay 746, and thereby the disconnection of the altitude indicator from the output of the smoother circuit, immediately upon the altimeter going to its search mode.

As will be explained hereinafter in conjunction with the explanation of FIGURE 9, the smoother circuit 879 has a memory which remembers the aircraft's altitude at the time that the input to the smoother circuit was disconnected from the output of integrator 507, and this altitude reading will be fed to the altitude indicator until relay 746 is deenergized. If the altimeter search mechanism reestablishes coincidence between the track and the video pulse before capacitor 737 discharges then relay 746 will remain energized and there will be no interruption in the altitude indication.

When transistor 664 conducts, the potential at its collector 665 drops to approximately ground potential and this negative going wave is coupled through resistor 680 to terminal 467, and from terminal 467 to the anode of diode 466 (see FIGURE 6) thereby backbiasing diode 466. When diode 466 is backbiased, the cathode of diode 465 becomes negative with respect to its anode and diode 465 conducts, thereby shorting out the input to the first integrator circuit 471. Furthermore, the negative going wave on the collector 665 of transistor 664 (see FIGURE 8) is coupled through resistor 682 to terminal 485 and from terminal 485 to the cathode of diode 484 (see FIGURE 6) thereby causing diode 484 to conduct and thereby applying a substantially negative step input signal to the input of integrator 507.

The negative step input signal at the input of integrator 507 produces a positive ramp signal on the collector 497 of transistor 496 which is coupled to terminal 277 and from terminal 277 through resistor 276 to the cathode 248 of comparator diode 247 (see FIGURE 4).

The ramp function on the cathode 248 of comparator diode 247 continually varies the time at which comparator diode 247 will conduct and hence varies the time at which the track gate and the TAGC gate are generated. In other words, the ramp output of integrator 507 causes the track gate and the TAGC gate to sweep through the entire altimeter range.

The ramp signal at the output of integrator 507 (see FIGURE 6) is further coupled through Zener diode 512 to terminal 513, and from terminal 513 to the wiper 796 of potentiometer 794 (see FIGURE 8) thereby increasing the potential on conductor 797 and the base 781 of transistor 777. When the ramp output of integrator 507 reaches a maximum value corresponding to the maximum range of the altimeter, the potential at the base 781 of transistor 777 will be sufficient to cause transistor 777 to conduct. The conduction path for transistor 777 is from the positive potential source 166 through resistor 783, collector 780 to emitter 782 of transistor 777, and base 802 to emitter 803 of transistor 800 to the negative potential source 160. The base to emitter current of transistor 800 causes this transistor to conduct and hence the potential at the collectors 780 and 801, of transistors 777 and 800 respectively, decreases. This decrease in potential is coupled through resistor 784 to the base 772 of transistor 770 and tends to decrease the conduction of transistor 770. When the conduction of transistor 770 decreases, the potential at its collector 771 increases and this increase in potential is coupled through resistor 776 and capacitor 775 to the base 781 of transistor 777 further increasing the conduction of transistor 777. This regenerative action continues until transistors 777 and 800 are fully conducting and transistor 770 is cut off.

When transistor 770 cuts off, its collector potential increases and this positive signal is coupled through conductor 765 to terminal 487, and from terminal 487 to the anode of diode 486 (see FIGURE 6) causing diode 486 to conduct and thereby applying a substantially positive step input signal to the input of integrator 507.

The positive step input signal to the input of integrator 507 causes a negative ramp signal to appear at the collector 497 of transistor 496 which is coupled to terminal 277 and from terminal 277 through resistor 276 to the cathode 248 of comparator diode 247 (see FIGURE 4). The negative ramp signal from the output of integrator 507 again varies the time at which the track gate and the TAGC gate are generated and effectively causes the track gate and the TAGC gate to be swept back through the entire altimeter range.

The negative ramp output from integrator 507 is further connected from terminal 277 through conductor 810 (see FIGURE 9) to the cathode of diode 811. When the negative going ramp signal at the cathode of diode 811 reaches a value corresponding to the minimum limit of the altimeter range, diode 811 conducts and a negative going signal is applied through conductor 814 and diode 816 to the base 819 of transistor 817 thereby decreasing the conduction of transistor 817. As the conduction of transistor 817 decreases, the potential at its collector 818 increases and this positive going signal is coupled through Zener diode 822 to terminal 792, and from terminal 792 through resistor 791 (see FIGURE 8), and diode 790 to the base 772 of transistor 770 thereby causing transistor 770 to conduct. When transistor 770 conducts, the potential at its collector 771 decreases and this decrease in potential is coupled through resistor 776 and capacitor 775 to the base 781 of transistor 777 thereby decreasing the conduction of transistor 777. This regenerative action continues in normal multivibrator action until transistor 770 is fully conductive and transistor 777 and 800 are cut off. When transistor 770 is fully conductive the potential at its collector 771 goes negative and this negative potential is coupled through resistor 767 and conductor 765 to terminal 487, and from terminal 487 to the anode of diode 486 (see FIGURE 6) thereby backbiasing diode 486. When diode 486 is backbiased the negative output from the collector 665 of transistor 664 (see FIGURE 8) is again applied through diode 484 (see FIGURE 6) to the input of integrator 507 and thereby produces a positive ramp at the output of integrator 507, and the search operation is repeated.

The searching operation continues until the track gate and the TAGC gate again lock on a video pulse. When this occurs the positive output from emitter 563 of transistor 560 (see FIGURE 7) will again be coupled through conductor 565 to terminal 566, and from terminal 566 through resistor 640 (see FIGURE 8) and resistor 641 to the base 644 of transistor 642, thereby causing 642 to conduct and hence transistors 654 and 664 to shut off thereby deenergizing relay 670 and returning the altimeter to its track mode. The altitude signal appearing on the collector 497 of transistor 496 of integrator 507 (see FIGURE 6) is coupled through resistor 510, conductor 516 to terminal 517, and from terminal 517 through movable contact 685 of relay 670 (see FIGURE 8) fixed contact 686, to terminal 692, and from terminal 692 through conductor 830 (see FIGURE 9) to the input of smoother circuit 879 at the base 833 of transistor 831. This signal on the base 833 of transistor 831 further charges capacitors 854 and 855 to a value proportional to the altitude signal. The altitude signal is amplified in transistor 831 and is coupled through diode 860 to the base 863 of transistor 861 where it is further amplified. The output from transistor 861 at its collector 862 is coupled through resistor 866 to the base 869 of emitter follower transistor 867. The output from the emitter 870 of transistor 867 is coupled through resistor 874 to terminal 761, and from terminal 761 to fixed contact 755 of relay 746 (see FIGURE 8), and movable contact 753 of relay 746 to terminal 760. Terminal 760 is adapted to be connected to an indicating device, such as a meter calibrated to indicate altitude.

When the altimeter switches to its search mode, movable contact 685 of relay 670 (see FIGURE 8) is disconnected from fixed contact 686 and hence the input to smoother circuit 879 is disconnected from the output of integrator 507. At this time the charge on capacitors 854 and 855 (see FIGURE 9) which is proportional to the altitude signal at the time relay 670 was energized, maintains the altitude reading on the altitude indicator at the aircraft's altitude at the time that relay 670 was energized.

If the altimeter does not relocate the video signal during the delay time before the deenergization of relay 746, relay 746 will deenergize and disconnect the altitude indicator from the output of the smoother circuit.

*Range switching*

Referring to FIGURE 10, there is shown a scale switch 931 which can be manually set to either a short range position, a long range position, or an automatic position. When wiper 934 of scale switch 931 is connected to fixed contact 930 of switch 931, the base 925 of transistor 923 will be connected directly to ground and hence transistor 923 will be nonconducting. Since transistor 923 is nonconducting, winding 898 of relay 895 will be deenergized and movable contact 896 of relay 895 will be connected to fixed contact 894. With movable contact 896 in connection with fixed contact 894, a current will flow from the positive potential source 673 through movable contact 896, fixed contact 894, conductor 940, terminal 211, and relay winding 212' (see FIGURE 3) of relay 212 thereby energizing relay 212 and moving movable contact 214 out of engagement with fixed contact 215 and into engagement with fixed contact 216. The energization of relay 212 further disengages movable contact 217 from fixed contact 218 (see FIGURE 4) and engages it with fixed contact 219.

The current flow from terminal 211 of FIGURE 10 also flows through terminal 211 of FIGURE 6 and energizes winding 443 of relay 444. When relay 444 is energized movable contact 445 is disengaged from fixed contact 446 and engages fixed contact 447, while movable contact 450 disengages fixed contact 452 (see FIGURE 9) and engages fixed contact 451.

When wiper 934 (see FIGURE 10) is connected to contact 933 of scale switch 931, relay winding 898 of relay 895 is energized from the positive potential source 673 through winding 898, fixed contact 933, and wiper 934 to ground 157. When relay 895 is energized, movable contact 896 is disconnected from fixed contact 894 and is connected to fixed contact 897. Since the positive potential source is now removed from winding 212' of relay 212 and winding 443 of relay 444 these relays will become deenergized and their contacts will reverse position. Since movable contact 896 of relay 895 is now connected to fixed contact 897 a current will flow from the positive potential source 673 through movable contact 896, fixed contact 897, and conductor 941 to terminal 942. Terminal 942 is adapted to be connected to an indicator light on the aircraft instrument panel to notify the pilot that the altimeter is in its long range position.

When wiper 934 of scale switch 931 is in contact with fixed contact 932, the altimeter is in its automatic position and the altimeter will automatically change between its short range and its long range depending upon the aircraft altitude. In other words, if the aircraft is at an altitude higher than the maximum range of the altimeter short range, the altimeter will automatically switch to its long range position. Similarly, if the aircraft's altitude decreases to within the range of the altimeter's short range, then the altimeter will automatically switch to its short range position. Furthermore, during the search operation, the altimeter will automatically search on the short range for a predetermined time and then switch and search on the long range for a predetermined time. This alternate search operation continues until the track gate again locates a video target.

The alternate search operation is accomplished as follows: when the track gate and the TAGC gate lose coincidence with the video pulse, or in other words, when the altimeter switches to its searching mode, relay 670 (see FIGURE 8) will be energized as previously explained. When relay 670 is energized, movable contact 688 engages fixed contact 689 and a negative signal is applied from the negative potential source 160 through movable contact 688, fixed contact 689, terminal 733, conductor 971 (see FIGURE 10), resistor 965, diode 962, and diode 953 to the base 956 of transistor 954 thereby holding transistor 954 in an off or nonconducting state.

At the same time, a positive signal is coupled from the positive potential source 166 through resistor 695 (see FIGURE 8), conductor 696, terminal 697 and resistor 880 (see FIGURE 10) and charges capacitor 890. After a predetermined time, capacitor 890 will have charged sufficiently so that a positive potential coupled to the emitter 883 of unijunction transistor 882 will fire this transistor and base 885 of unijunction 882 will drop to approximately ground potential. The negative going signal on the base 885 of unijunction transistor 882 is coupled through diode 900, capacitor 937, and resistor 921 to the base 906 of transistor 904 thereby decreasing the conduction of transistor 904. As the conduction of transistor 904 decreases, the potential on its collector 905 increases and this increase in potential is coupled through resistor 912 to the base 915 of transistor 913 causing transistor 913 to conduct. As transistor 913 conducts, the potential on its collector 914 decreases and this decrease in potential is coupled through resistor 921 to the base 906 of transistor 904 thereby further decreasing the conduction of transistor 904. This regenerative action continues until transistor 904 is shut off and transistor 913 is fully conducting. When transistor 913 is fully conducting, the potential at its collector 914 will be at substantially ground potential. The potential on the collector 914 of transistor 913 is coupled through Zener diode 927 to the base 925 of transistor 923 thereby cutting off transistor 923 and deenergizing relay 895. When relay 895 is deenergized, its movable contact 896 engages fixed contact 894 which, as explained previously, results in the altimeter switching to its short range.

When unijunction transistor 882 fires, capacitor 890 discharges through resistor 881 and emitter 883 to base 884 of unijunction transistor 882 to ground 157. When capacitor 890 is sufficiently discharged, unijunction transistor 882 will shut off and capacitor 890 will again begin to charge. After a predetermined time, capacitor 890 will again be charged sufficiently so that unijunction transistor 882 again fires. The negative going signal on the base 885 of unijunction transistor 882 is coupled through diode 892, capacitor 903, and resistor 912 to the base 915 of transistor 913 thereby cutting off transistor 913. When transistor 913 cuts off, the potential on its collector 914 rises and this increase in potential is coupled through resistor 921 to the base 906 of transistor 904 thereby driving transistor 904 into conduction.

The rise in potential on the collector 914 of transistor 913 is further coupled through Zener diode 927 to the base 925 of transistor 923 thereby driving transistor 923 into conduction. When transistor 923 conducts, a current will flow from the positive potential source 673 through winding 898 of relay 895, collector 924 to emitter 926 of transistor 923 to ground 157, thereby energizing relay 895. When relay 895 is energized, movable contact 896 will be disconnected from fixed contact 894 and connected to fixed contact 897 which, as explained previously, will switch the altimeter to its long range position.

This scale switching action continues until the track gate and the TAGC gate are again in coincidence with the video pulse, at which time relay 670 (see FIGURE 8) will be deenergized and the altimeter will return to its track mode.

As mentioned previously, when wiper 934 of scale switch 931 is in engagement with contact 932 the altimeter is in its automatic position and will automatically change scales as the aircraft's altitude varies above and below the limit of the altimeter's short range. The operation of this automatic scale change is at follows. Assume that the aircraft is flying at some altitude above the limit of the altimeter's short range, so that the altimeter is operating on its long range position. In this situation, transistor 913 is cut off while transistor 904 is conducting. As the altitude of the aircraft decreases, the potential at the output of integrator 507 (see FIGURE 6) decreases. When the output of integrator 507 decreases sufficiently, or in other words when the altitude of the aircraft is approximately equal to the limit of the altimeter's short range, diode 811 (see FIGURE 9) will conduct and a negative going signal will be applied to the base 819 of transistor 817 tending to decrease the conduction of this transistor. The decrease in conduction of transistor 817 causes the potential on its collector 818 to rise and this positive going potential is coupled through Zener diode 822 to terminal 792 and from terminal 792 through conductor 981 (see FIGURE 10), resistor 952 and diode 953 to the base 956 of transistor 954, thereby causing transistor 954 to conduct. When transistor 954 conducts, the potential on its collector 955 drops and this decrease in potential is coupled through resistor 960, and resistor 921, to the base 906 of transistor 904, thereby decreasing the conduction of transistor 904. As explained previously, when the conduction of transistor 904 decreases, its collector potential increases and this increase in potential is coupled through resistor 912 to the base 915 of transistor 913 causing transistor 913 to conduct. This regenerative action continues until transistor 904 is completely nonconducting and transistor 913 is fully conducting. When transistor 913 conducts, the potential on its collector 914 drops and this decrease in potential is coupled through Zener diode 927 to the base 925 of transistor 923 thereby shutting off transistor 923 and deenergizing relay 895. As explained previously, when relay 895 is deenergized, the altimeter automatically reverts to its short range position.

Similarly, when the altimeter is on its short range position and the aircraft's altitude is increasing, the output of integrator 507 (see FIGURE 6) increases. The increase in the output of integrator 507 is coupled through Zener diode 512 to terminal 513, and from terminal 513 to potentiometer 794 (see FIGURE 8) to conductor 797. The wiper 796 of potentiometer 794 is set so that when the potential at the output of integrator 507 reaches a value corresponding to the maximum limit of the altimeter short range, the potential on conductor 797 will be sufficient to cause transistor 777 to conduct. When transistor 777 conducts, transistor 800 also conducts and the potential on its collector 801 drops. This decrease in potential of the collector 801 of transistor 800 is coupled to terminal 785, and from terminal 785 through resistor 976 (see FIGURE 10) and diode 975 to the base 915 of transistor 913 thereby shutting off transistor 913. When transistor 913 shuts off, transistor 904 conducts. Furthermore, when transistor 913 shuts off, the potential on its collector 914 increases and this increase in potential is coupled through Zener diode 927 to the base 925 of transistor 923 thereby causing transistor 923 to conduct. As explained previously, when transistor 923 conducts, relay 895 is energized and the altimeter automatically reverts to its long range position.

*Sensitivity control*

The purpose of the sensitivity control, or sensitivity range control (SRC) is to reduce the receiver gain progressively from some predetermined range to the zero range. This prevents overload of the receiver during the search phase.

Referring to FIGURE 10, the operation of the sensitivity control is as follows. Assume that the aircraft's altimeter is operating on its long range, and that the aircraft's altitude is decreasing. The output of integrator 507 (see FIGURE 6) is coupled to terminal 277, and from terminal 277 to the cathode of diode 1018 (see FIGURE 10). The anode of diode 1018 is connected to the junction 1017 between resistors 1015 and 1016. The potential at junction 1017 corresponds to the potential at the output of integrator 507 when the aircraft is flying at its predetermined altitude. Therefore, when the aircraft reaches its predetermined altitude, the potential at the anode and cathode of diode 1018 will be substantially equal. As the aircraft decreases further in altitude the potential at the cathode of diode 1018 decreases so that diode 1018 begins to conduct, thereby lowering the potential at the junction 1017 between resistors 1015 and 1016 to the value equal to the output potential of the integrator 507. As the potential at junction 1017 decreases, the potential at the junction 1014 between resistors 1013 and 1015 will begin to go negative and diode 1012 will conduct, thereby producing a negative output signal at terminal 1010. This negative output signal is fed back to the receiver IF strip and controls the gain of the IF amplifier. As assumed in the beginning of the discussion of the sensitivity control circuit, the altimeter is in its long range position, and therefore movable contact 896 of relay 895 is in engagement with fixed contact 897 and a positive signal will be coupled from the positive potential source 673 through movable contact 896, fixed contact 897, Zener diode 1006, and resistor 1007 to the negative potential source 242, thereby holding junction 1008 at a positive potential sufficient to back biase diode 1009. Since diode 1009 is non-conducting, the potential at terminal 1010 will vary with the potential at junction 1014, or in other words, as a function of the output of integrator 507.

When the aircraft's altitude decreases sufficiently so that the altimeter switches to its short range position, relay 895 will deenergize and movable contact 896 will be disconnected from fixed contact 897 and will be connected to fixed contact 894. Since movable contact 896 is no longer in engagement with fixed contact 897, the positive potential from source 673 will be removed from the cathode of diode 1005 and hence diode 1005 will conduct.

The conduction path for diode 1005 is from ground 157 through diode 1005, Zener diode 1006, and resistor 1007 to the negative potential source 242. The conduction of diode 1005 through Zener diode 1006 and resistor 1007 causes the junction 1008 to drop to a predetermined negative value. This predetermined negative value connected to the cathode of diode 1009 causes diode 1009 to conduct, and hence holds terminal 1010 at approximately this predetermined negative value. This predetermined negative signal is fed to the receiver IF strip and holds the receiver gain at a substantially constant decreased gain over the entire altimeter short range.

*Periodic recycle circuit*

The altimeter includes a periodic recycle circuit which periodically switches the altimeter to its search mode in order to determine that the altimeter is not tracking a false target or a recurrent internally generated spurious signal. Referring to FIGURE 8, the operation of the periodic recycle circuit is as follows.

When the altimeter is in its track mode, relay 670 is deenergized and movable contact 688 of relay 670 is in engagement with fixed contact 690. During this condition a current will flow from the positive potential source 190 through resistor 693, resistor 702, resistor 703, and capacitor 710 to the negative potential source 160, thereby charging capacitor 710. After a predetermined time, determined by the charge time of capacitor 710, the potential on the base 707 of transistor 705 will be sufficient to cause transistor 705 to conduct. The conduction path for transistor 705 is from the positive potential source 166 through collector 706 to emitter 708 of transistor 705, Zener diode 713, and base 716 to emitter 717 of transistor 714 to the negative potential source 160. The base to emitter current flow in transistor 714 causes transistor 714 to conduct and the potential on the collector 715 of transistor 714 drops to substantially the negative potential source 160. This negative potential is coupled through conductor 722 and resistor 641 to the base 644 of transistor 642, thereby cutting off transistor 642. As explained previously, when transistor 642 cuts off, the potential on its collector 643 rises and this increase in potential is coupled through diode 653 to the base 656 of transistor 654 causing transistor 654 to conduct. When transistor 654 conducts, transistor 664 also conducts and thereby energizes relay 670, causing the altimeter to switch to its search mode. When transistors 705 and 714 conduct, capacitor 710 is discharged through the base emitter electrodes of these transistors. When the potential on capacitor 710 has decreased sufficiently, transistors 705 and 714 again cut off.

When the track gate and TAGC gate again reestablish coincidence with the video pulse, the altimeter will revert to its tracking mode and capacitor 710 will again begin to change and, after a predetermined time, will reinitiate the recycle period.

Figure 11:
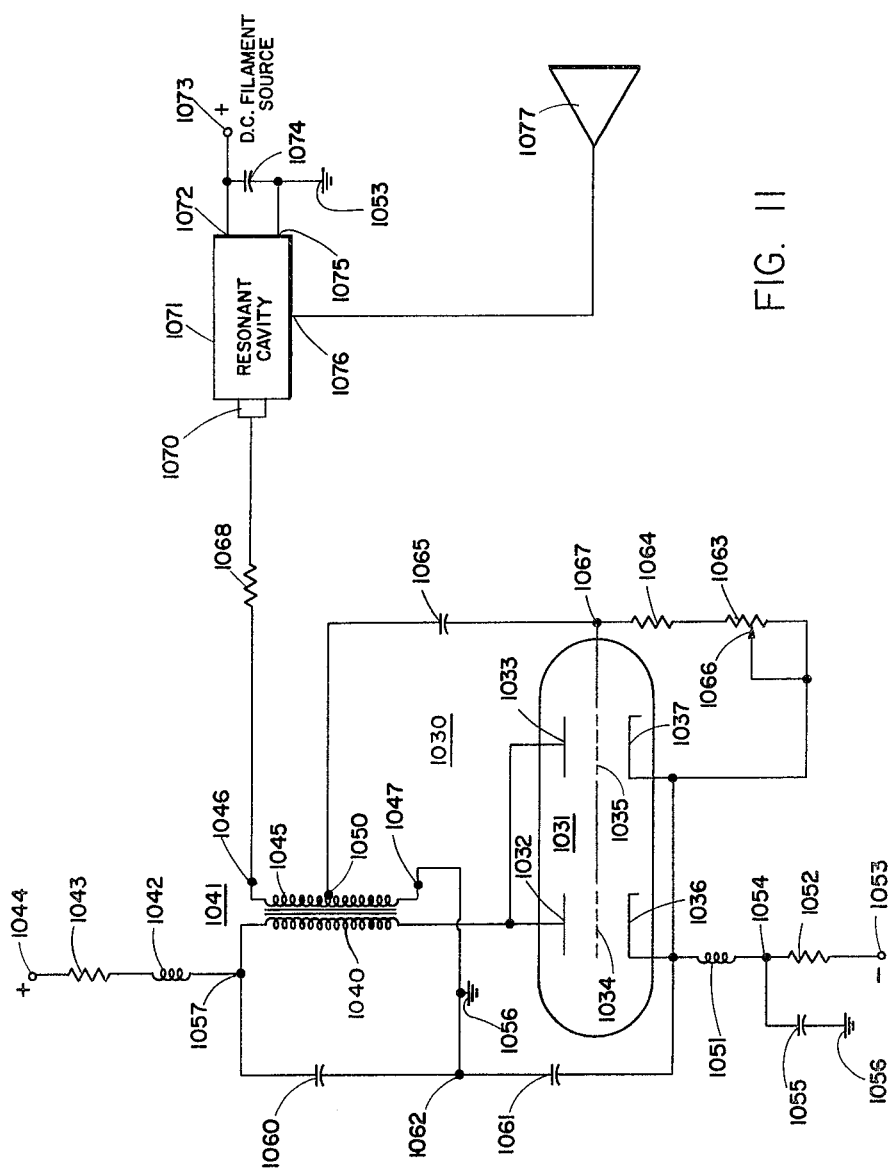
FIGURE 11 shows a schematic diagram of the altimeter modulator transmitter unit.

*Structure of FIGURE 11*

FIGURE 11 shows a schematic representation of the altimeter-modulator transmitter unit.

Referring to FIGURE 11, there is shown a blocking oscillator 1030 comprising a duo-triode vacuum tube 1031 having a first plate electrode 1032, a second plate electrode 1033, a first grid electrode 1034, a second grid electrode 1035, a first cathode electrode 1036, and a second cathode electrode 1037.

Duo-triode 1031 is parallel connected. In other words, plate electrodes 1032 and 1033 are connected in common, grid electrodes 1034 and 1035 are connected in common, and cathode electrodes 1036 and 1037 are connected in common.

Plate electrodes 1032 and 1033 of duo-triode 1031 are connected by means of a primary winding 1040 of a transformer 1041, a coil 1042, and a resistor 1043 to a positive potential source 1044. Transformer 1041 further has a center-tapped secondary winding 1045 having end terminals 1046 and 1047 and a center-tap terminal 1050.

Cathode electrodes 1036 and 1037 of duo-triode 1031 are connected by means of a coil 1051 in series with a resistor 1052 to a negative potential source 1053. A junction 1054 between coil 1051 and resistor 1052 is connected by means of a capacitor 1055 to ground 1056.

A junction 1057 between primary winding 1040 and coil 1042 is connected by means of a capacitor 1060 in series with a capacitor 1061 to the cathodes 1036 and 1037 of duo-triode 1031.

A junction 1062 between capacitors 1060 and 1061 is connected directly to ground 1056. End terminal 1047 of transformer secondary winding 1045 is connected to ground 1056.

Cathodes 1036 and 1037 of duo-triode 1031 are further connected by means of a potentiometer 1063, a resistor 1064, and a capacitor 1065 to the center-tap terminal 1050 of secondary winding 1045. Potentiometer 1063 further has a wiper 1066 which is connected directly to cathodes 1036 and 1037 of duo-triode 1031.

A junction 1067 between resistor 1064 and capacitor 1065 is connected directly to grid electrodes 1034 and 1035 of duo-triode 1031.

End terminal 1046 of transformer secondary winding 1045 is connected by means of a resistor 1068 to an input 1070 of a transmitter resonant cavity 1071. A filament terminal 1072 of transmitter resonant cavity 1071 is connected directly to a filament potential source 1073, and by means of a capacitor 1074 to ground 1053. A filament terminal 1075 of transmitter resonant cavity 1071 is connected to ground 1053.

An output terminal 1076 of transmitter resonant cavity 1071 is connected to a transmitter antenna 1077.

*Operation of FIGURE 11*

The operation of the modulator-transmitter shown in FIGURE 11 is as follows. Assume that duo-triode 1031 of blocking oscillator 1030 is just beginning to conduct. The conduction path for duo-triode 1031 is from the positive potential source 1044 through resistor 1043, coil 1042, primary winding 1040 of transformer 1041, plates 1032 and 1033 to cathodes 1036 and 1037 of duo-triode 1031, coil 1051, and resistor 1052 to the negative potential source 1053.

The current flow through the primary winding 1040 of transformer 1041 induces a voltage in the secondary winding 1045 such that terminal 1046 is positive with respect to terminal 1050, and terminal 1050 is positive with respect to terminal 1047. The positive signal at center-tapped terminal 1050 of secondary winding 1045 is coupled through capacitor 1065 to the grids 1034 and 1035 of duo-triode 1031, thereby increasing the conduction of duo-triode 1031.

The increase in conduction of duo-triode 1031 further increases the current flow through the primary winding 1040 of transformer 1041, which in turn increases the positive feedback signal coupled from the center-tap terminal 1050 of secondary winding 1045 to the grids 1034 and 1035 of duo-triode 1031. This regenerative action continues until duo-triode 1031 saturates, at which time the positive signal being induced in secondary winding 1045 disappears. When the feedback signal from secondary winding 1045 disappears, the conduction of duo-triode 1031 decreases, thereby decreasing the current flow through primary winding 1040 of transformer 1041. The decrease in the current flow through primary winding 1040 causes a signal to be induced in the secondary winding 1045 such that terminal 1046 is negative with respect to terminal 1050, and terminal 1050 is negative with respect to terminal 1047. The negative signal at terminal 1050 of secondary winding 1045 is coupled through capacitor 1065 to the grids 1034 and 1035 of duo-triode 1031, thereby decreasing the conduction of duo-triode 1031. When the conduction of duo-triode 1031 decreases, the current flow through primary winding 1040 of transformer 1041 also decreases, thereby inducing a more negative signal in secondary winding 1045. This regenerative action continues until duo-triode 1031 is cut off, after which time the cycle will repeat.

As can be seen from the above description of operation, the current flow through primary winding 1040 of transformer 1041 causes a pulse to be induced in secondary winding 1045 such that terminal 1046 is positive with respect to terminal 1047. This induced pulse is of very short pulse width, in the order of a few nanoseconds, and is coupled through resistor 1068 to the input 1070 of the transmitter resonant cavity 1071, thereby causing the resonant cavity to generate an output pulse at its output terminal 1076 which is coupled to transmitter antenna 1077 and an RF energy pulse is radiated.

The transmitter PRF can be varied by varying the position of wiper 1066 of potentiometer 1063. Varying the setting of potentiometer 1063 changes the time constant of capacitor 1065 and in turn changes the pulse repetition frequency.

It is to be understood that while we have shown a specific embodiment of our invention, this is for the purpose of illustration only and we intend to be limited solely by the scope of the appended claims.

What is claimed is:

1. A distance measuring device operable over a predetermined range comprising: sawtooth generating means operable in response to a first signal; double integrating means, comparator means connected to receive signals from said sawtooth generating means and said double integrating means and to produce an output signal when the instantaneous magnitude of the sawtooth signal is equal to the output of said double integrating means; gate generating means operable in response to the output signal from said comparator means for producing first and second gates having a fixed time relationship; signal generating means for generating a second signal some time after the occurrence of said first signal; first coincident gate means connected to receive the second signal from said signal generating means; means connecting the first gate from said gate generating means to said first coincident gate means whereby said first coincident gate means produces an output signal proportional to the leading edge of said second signal; means connecting the output signal from said first coincident gate means to the input of said double integrating means; second coincident gate means connected to receive the second signal from said signal generating means; means connecting the second gate from said gate generating means to said second coincident gate means whereby said second coincident gate means produces an output signal proportional to the magnitude of said second signal when said second gate and said second signal are time coincident; means connecting the output signal of said second coincident gate means to said signal generating means so as to hold the magnitude of said second signal constant; range sweep means having an input and an output; means connecting the input of said range sweep means to the output of said second coincident gate means, the output signal from said second coincident gate means holding said range sweep means inoperative; and means connecting the output of said range sweep means to said double integrating means, whereby said range sweep means, when operative, sweeps the output of said double integrating means to a limit in one direction, said range sweep means further having means operative upon said double integrating means reaching said limit in one direction to sweep the output of said double integrating means to a limit in an opposite direction.

2. An altimeter comprising: transmitter means for transmitting an energy pulse to a reflecting object; receiver means for receiving a reflected energy pulse from said object, said receiver means including means for converting said reflected energy pulse to a video signal; time modulator means adapted to receive a signal indicative of said transmitted pulse and operable so as to produce a first and a second gate output a known time after the output of said transmitter means; first and second coincident gate means connected so as to receive said video signal; means connecting the first gate output from said time modulator means to said first coincident gate means whereby said first coincident gate means produces an output signal proportional to the leading edge of said video signal; double integrating means connected to receive the output signal from said first coincident gate means; means connecting the output of said double integrating means to said time modulator means to control the position of the first and second gates whereby the first and second gates are repositioned to follow any changes in the time between the transmitting of the energy pulse and the receiving of the reflected energy pulse; means connecting the second gate output from said time modulator means to said second coincident gate means whereby said second coincident gate means produces an output signal proportional to the magnitude of said video pulse; and means connecting the output signal from said second coincident gate means to said receiver means so as to control the gain of said receiver means and hold the magnitude of said video signal constant.

3. A multiple range altimeter comprising: transmitter means for transmitting an energy pulse to a reflecting object; receiver means for receiving a reflected energy pulse from said object, said receiver means including means for converting said reflected energy pulse to a video signal; time modulator means adapted to receive a signal indicative of said transmitted pulse and operable so as to produce a first and a second gate output a known time after the output of said transmitter means; first and second coincident gate means connected so as to receive said video signal; means connecting the first gate output from said time modulator means to said first coincident gate means whereby said first coincident gate means produces an output signal proportional to the leading edge of said video signal; double integrating means connected to receive the output signal from said first coincident gate means; means connecting the output of said double integrating means to said time modulator means to control the position of the first and second gates whereby the first and second gates are repositioned to follow any changes in the time between the transmitting of the energy pulse and the receiving of the reflected energy pulse; means connecting the second gate output from said time modulator means to said coincident gate means whereby said second coincident gate means produces an output signal proportional to the magnitude of said video pulse; means connecting the output signal from said second coincident gate means to said receiver means so as to control the gain of said receiver means and hold the magnitude of said video signal constant; and range switching means connected to the output of said double integrating means and adapted to change the range of said altimeter when the output of said double integrating means reaches a predetermined magnitude.

4. A distance measuring device operable over a predetermined range comprising: time modulator means responsive to a first signal and operable so as to produce a first gate output and a second gate output a known time after the occurrence of said first signal; signal generating means for generating a second signal some time after the occurrence of said first signal; first and second coincident gate means connected so as to receive said second signal from said signal generating means; means connecting the first gate output from said time modulator means to said first coincident gate means whereby said first coincident gate means produces an output signal proportional to the leading edge of said second signal; double integrating means connected to receive the output signal from said first coincident gate means; means connecting the output of said double integrating means to said time modulator means to control the position of said first and second gates whereby the first and second gates are repositioned to follow any changes in the time between the occurrence of said first signal and said second signal; means connecting the second gate output from said time modulator means to said second coincident gate means whereby said second coincident gate means produces an output signal proportional to the magnitude of said second signal when said second gate output and said second signal are time coincident; means connecting the output of said second coincident gate means to said signal generating means, the output signal from said second coincident gate means controlling said signal generating means so as to hold the magnitude of said second signal constant; range sweep means having an input and an output; means connecting the input of said range sweep means to the output of said second coincident gate means, the output signal from said second coincident gate means holding said range sweep means inoperative; means connecting the output of said range sweep means to said double integrating means, whereby said range sweep means, when operative, sweeps the output of said double integrating means to a limit in one direction, said range sweep means further having means operative upon said double integrating means reaching said limit in one direction to sweep the output of said double integrating means to a limit in an opposite direction; and periodic recycle means connected to said range sweep means, said periodic recycle means operating when said second gate output and said second signal are coincident to periodically activate said range sweep means, said periodic recycle means further being held inoperative when said second gate output and said second signal are out of coincidence.

5. A distance measuring device comprising: time modulator means responsive to a first signal and operable so as to produce a gate output a known time after the occurrence of said first signal; a single coincident gate connected so as to receive a second signal; means connecting the gate output from said time modulator means to said coincident gate whereby said coincident gate produces a variable output signal proportional to the leading edge of said second signal; double integrating means connected to receive the variable output signal from said coincident gate exclusive of any other variable signals; and means connecting the output of said double integrating means to said time modulator means to control the position of said gate whereby the gate is repositioned to follow any changes in the time between the occurrence of said first signal and said second signal.

6. An altimeter comprising: transmitter means for transmitting an energy pulse to a reflecting object; receiver means for receiving a reflected energy pulse from said object, said receiver means including means for converting said reflected energy pulse to a video signal; sawtooth generating means adapted to operate in synchronism with the output of said transmitter means; double integrating means having an input and a first and second output; comparator means connected to receive signals from said sawtooth generating means and from the second output of said double integrating means and to produce an output signal when the instantaneous magnitude of the sawtooth signal is equal to the second output of said double integrating means; gate generating means operable in response to the output signal from said comparator means for producing first and second gates; first coincident gate means connected to receive the video signal from said receiver means; means connecting the first gate from said gate generating means to said first coincident gate means whereby said first coincident gate means produces an output signal proportional to the leading edge of said video signal; means connecting the output signal from said first coincident gate means to the input of said double integrating means; means connecting the first output of said double integrating means to an altitude rate indicator; means connecting the second output of said double integrating means to an altitude indicator; second coincident gate means connected to receive the video signal from said receiver means; means connecting the second gate generating means to said second coincident gate means whereby said second coincident gate means produces an output signal proportional to the magnitude of said video pulse; means connecting the output signal of said second coincident gate means to said receiver means so as to control the gain of said receiver means and hold the magnitude of the receiver video output signal constant; range sweep means having an input and an output; means connecting the input of said range sweep means to the output of said second coincident gate means, the output signal from said second coincident gate means holding said range sweep means inoperative; means connecting the output of said range sweep means to said double integrating means, whereby said range sweep means, when operative, sweeps the second output of said double integrating means to a limit in one direction, said range sweep means further having means operative upon the second output of said double integrating means reaching said limit in one direction to sweep the second output of said double integrating means to a limit in an opposite direction; and periodic recycle means connected to said range sweep means, said periodic recycle means operating when said second gate output and said second signal are coincident to periodically activate said range sweep means, said periodic recycle means further being held inoperative when said second gate output and said second signal are out of coincidence.

7. An altimeter operable over a predetermined range comprising: transmitter means for transmitting an energy pulse to a reflecting object; receiver means for receiving a reflected energy pulse from said object, said receiver means including means for converting said reflected energy pulse to a video signal; time modulator means adapted to receive a signal indicative of said transmitted pulse and operable so as to produce a first gate output and a second gate output a known time after the output of said transmitter means; first and second coincident gate means connected so as to receive said video signal; means connecting the first gate output from said time modulator means to said first coincident gate means whereby said first coincident gate means produces an output signal proportional to the leading edge of said video signal; first and second integrating means each having an input and an output; means connecting the output of said first integrating means to the input of said second integrating means; means connecting the input of said first integrating means so as to receive the output signal from said first coincident gate means; means connecting the output said second integrating means to said time modulator means, the output of said second integrating means controlling the position of said first and second gates whereby the first and second gates are repositioned to follow any changes in the time between the transmitting of the energy pulse and the receiving of the reflected energy pulse; means connecting the second gate output from said time modulator means to said second coincident gate means whereby said second coincident gate means produces an output signal proportional to the peak magnitude of said video signal when said second gate output and said video signal are time coincident; and range sweep means having an input connected to the output of the said second conicident gate means and an output connected to the input of said second integrating means and comprising in combination control means connected so as to sense the output of said second coincident gate means and to hold said range sweep means inoperative when said video signal and said second gate output are in coincidence, said control means being further operative upon said video signal and said second gate output being out of coincidence to inhibit said first integrating means and to apply a substantially step input signal to the input of said second integrating means thereby sweeping the output of said second integrating means to a limit in one direction, recycle means having an input and an output, means connecting the input of said recycle means to the output of said second integrating means, means connecting the output of said recycle means to the input of said second integrating means, said recycle means becoming operative upon said second integrating means reaching said limit in one direction to sweep said second integrating means to a limit in an opposite direction, and stop recycle means connected so as to inhibit said recycle means when said second integrating means reaches said limit in an opposite direction and to allow said control means to again sweep said second integrating means to said limit in one direction.

8. An altimeter comprising: transmitter means for transmitting an energy pulse to a reflected object; receiver means for receiving a reflected energy pulse from said object, said receiver means including means for converting said reflected energy pulse to a video signal; sawtooth generating means adapted to operate in synchronism with the output of said transmitter means; double integrating means; comparator means connected to receive signals from said sawtooth generating means and said double integrating means and to produce an output signal when the instantaneous magnitude of the sawtooth signal is equal to the output of said double integrating means; gate generating means operable in response to the output signal from said comparator means for producing first and second gates; first coincident gate means connected to receive the video signal from said receiver means; means connecting the first gate from said gate generating means to said first coincident gate means whereby said first coincident gate means produces an output signal proprotional to the leading edge of said video signal; means connecting the output signal from said first coincident gate means to the input of said double integrating means; second coincident gate means connected to receive the video signal from said receiver means; means connecting the second gate generating means to said second coincident gate means whereby said second coincident gate means produces an output signal proportional to the magnitude of said video pulse; means connecting the output signal of said second coincident gate means to said receiver means so as to control the gain of said receiver means and hold the magnitude of the receiver video output signal constant; range sweep means having an input and an output; means connecting the input of said range sweep means to the output of said second coincident gate means, the output signal from said second coincident gate means holding said range sweep means inoperative; means connecting the output of said range sweep means to said double integrating means, whereby said range sweep means, when operative, sweeps the output of said double integrating means to a limit in one direction, said range sweep means further having means operative upon said double integrating means reaching said limit in one direction to sweep the output of said double integrating means to a limit in an opposite direction; and periodic recycle means connected to said range sweep means, said periodic recycle means operating when said second gate output and said second signal are coincident to periodically activate said range sweep means, said periodic recycle means further being held inoperative when said second gate output and said second signal are out of coincidence.

9. A distance measuring device operable over a predetermined range comprising: time modulator means responsive to a first signal and operable so as to produce a first gate output and a second gate output a known time after the occurrence of said first signal; first and second coincident gate means connected so as to receive a second signal; means connecting the first gate output from said time modulator means to said first coincident gate means whereby said first coincident gate means produces an output signal proportional to the leading edge of said second signal; double integrating means connected to receive the output signal from said first coincident gate means; means connecting the output of said double integrating means to said time modulator means to control the position of said first and second gates whereby the first and second gates are repositioned to follow any changes in the time between the occurrence of said first signal and said second signal; means connecting the second gate output from said time modulator means to said second coincident gate means whereby said second coincident gate means produces an output signal proportional to the magnitude of said second signal when said second gate output and said second signal are time coincident; range sweep means having an input and an output; means connecting the input of said range sweep means to the output of said second coincident gate means, the output signal from said second coincident gate means holding said range sweep means inoperative; and means connecting the output of said range sweep means to said double integrating means, whereby said range sweep means, when operative, sweeps the output of said double integrating means to a limit in one direction, said range sweep means further having means operative upon said double integrating means reaching said limit in one direction to sweep the output of said double integrating means to a limit in an opposite direction.

10. A distance measuring device operable over a predetermined range comprising: time modulator means responsive to a first signal and operable so as to produce a first gate output and a second gate output a known time after the occurrence of said first signal; signal generating means for generating a second signal some time after the occurrence of said first signal; first and second coincident gate means connected so as to receive said second signal from said signal generating means; means connecting the first gate output from said time modulator means to said first coincident gate means whereby said first coincident gate means produces an output signal proportional to the leading edge of said second signal; double integrating means connected to receive the output signal from said first coincident gate means; means connecting the output of said double integrating means to said time modulator means to control the position of said first and second gates whereby the first and second gates are repositioned to follow any changes in the time between the occurrence of said first signal and said second signal; means connecting the second gate output from said time modulator means to said second coincident gate means whereby said second coincident gate means produces an output signal proportional to the magnitude of said second signal when said second gate output and said second signal are time coincident; means connecting the output of said second coincident gate means to said signal generating means, the output signal from said second coincident gate means controlling said signal generating means so as to hold the magnitude of said second signal constant; range sweep means having an input and an output; means connecting the input of said range sweep means to the output of said second coincident gate means, the output signal from said second coincident gate means holding said range sweep means inoperative; and means connecting the output of said range sweep means to said double integrating means, whereby said range sweep means, when operative, sweeps the output of said double integrating means reaching said limit in one direction to sweep the output of said double integrating means to a limit in an opposite direction.

11. An altimeter comprising: transmitter means for transmitting an energy pulse to a reflecting object; receiver means for receiving a reflected energy pulse from said object, said receiver means including means for converting said reflected energy pulse to a video signal; sawtooth generating means adapted to operate in synchronism with the output of said transmitter means; double integrating means; comparator means connected to receive signals from said sawtooth generating means and said double integrating means and to produce an output signal when the instantaneous magnitude of the sawtooth signal is equal to the output of said double integrating means; gate generating means operable in response to the output signal from said comparator means for producing first and second gates; first coincident gate means connected to receive the video signal from said receiver means; means connecting the first gate from said gate generating means to said first coincident gate means whereby said first coincident gate means produces an output signal proportional to the leading edge of said video signal; means connecting the output signal from said first coincident gate means to the input of said double integrating means; second coincident gate means connected to receive the video signal from said receiver means; means connecting the second gate from said gate generating means to said second coincident gate means whereby said second coincident gate means produces an output signal proportional to the pulse magnitude of said video pulse; means connecting the output signal of said second coincident gate means to said receiver means so as to control the gain of said receiver means and hold the magnitude of the receiver video output signal constant; range sweep means having on input and an output; means connecting the input of said range sweep means to the output of said second coincident gate means, the output signal from said second coincident gate means holding said range sweep means inoperative; and means connecting the output of said range sweep means to said double integrating means, whereby said range sweep means, when operative, sweeps the output of said double integrating means to a limit in one direction, said range sweep means further having means operative upon said double integrating means reaching said limit in one direction to sweep the output of said double integrating means to a limit in an opposite direction.

12. An altimeter comprising: transmitter means for transmitting an energy pulse to a reflected object; receiver means for receiving a reflected energy pulse; said receiver means including means for converting said reflected energy pulls to a video signal; sawtooth generating means adapted to operate in synchronism with the output of said transmitter means; double integrating means; comparator means connected to receive signals from said sawtooth generating means and said double integrating means and to produce an output signal when the instantaneous magnitude of the sawtooth signal is equal to the output of said double integrating means; gate generating means operable in response to the output signal from said comparator means for producing first and second gates; first coincident gate means connected to receive the video signal from said receiver means; means connecting the first gate from said gate generating means to said first coincident gate means whereby said first coincident gate means produces an output signal proportional to the leading edge of said video signal; means connecting the output signal from said first coincident gate means to the input of said double integrating means; second coincident gate means connected to receive the video signal from said receiver means; means connecting the second gate from said gate generating means to said second coincident gate means whereby said second coincident gate means produces an output signal proportional to the pulse magnitude of said video pulse; and means connecting the output signal of said second coincident gate means to said receiver means so as to control the gain of said receiver means and hold the magnitude of the receiver video output signal constant.

13. A distance measuring device operable over a predetermined range comprising: time modulator means responsive to a first signal and operable so as to produce a first gate output and a second gate output a known time after the occurrence of said first signal; signal generating means for generating a second signal some time after the occurrence of said first signal; first and second coincident gate means; a second signal bus having an input connected so as to receive said second signal from said signal generating means and an output connected to said first and second coincident gate means; means connecting the first gate output from said time modulator means to said first coincident gate means whereby said first coincident gate means produces an output signal proportional to the leading edge of said second signal; double integrating means connected to receive the output signal from said first coincident gate means; means connecting the output of said double integrating means to said time modulator means to control the position of said first and second gates whereby the first and second gates are repositioned to follow any changes in the time between the occurrence of said first signal and said second signal; means connecting the second gate output from said time modulator means to said second coincident gate means whereby said second coincident gate means produces an output signal proportional to the magnitude of said second signal when said second gate output and said second signal are time coincident; means connecting the output of said second coincident gate means to said signal generating means, the output signal from said second coincident gate means controlling said signal generating means so as to hold the magnitude of said second signal constant; noise automatic gain control means having an input and an output; means connecting the input of said noise automatic gain control means to said second signal bus; and means connecting the output of said noise automatic gain control means to said signal generating means, said noise automatic gain control means operating to sense the noise level on said second signal bus and to control the signal generating means to hold said noise level substantially constant.

14. A distance measuring device comprising: time modulator means responsive to a first signal and operable so as to produce a gate output a known time after the occurrence of said first signal; a single coincident gate connecting the gate output from said time modulator means to said coincident gate whereby said coincident gate produces a variable output signal proportional to the leading edge of said second signal; double integrating means connected to receive the variable output signal produced by said coincident gate to the exclusion of any other variable signals, said double integrating means having a first output and a second output; means connecting the first output of said double integrating means to a rate of change of distance indicator; means connecting the second output of said double integrating means to said time modulator means to control the position of said gate whereby the gate is repositioned to follow any changes in the time between the occurrence of said first signal and said second signal; and means connecting the second output of said double integrating means to a distance indicator.

15. A multiple range distance measuring device comprising: time modulator means responsive to a first input and operable so as to produce a gate output a known time after the occurrence of said first signal; coincident gate means connected so as to receive a second signal; means connecting the gate output from said time modulator means to said coincident gate means whereby said coincident gate means produces an output signal proportional to the leading edge of said second signal; double integrating means connected to receive the output signal from said coincident gate means; means connecting the output of said double integrating means to said time modulator means to control the position of said gate whereby the gate is repositioned to follow any changes in the time between the occurrence of said first signal and said second signal; and range switching means connected to the output of said double integrating means and adapted to change the range of said distance measuring device when the output of said double integrating means reaches a predetermined magnitude.

16. An altimeter comprising: transmitter means for transmitting an energy pulse to a reflecting obect; receiver means for receiving a reflected energy pulse from said object, said receiver means including means for converting said reflected energy pulse to a video signal; time modulator means adapted to receive a signal indicative of said transmitted pulse and operable so as to produce a gate output a known time after the output of said transmitter means; coincident gate means connected so as to receive said video signal; means connecting the gate output from said time modulator means to said coincident gate means whereby said coincident gate means produces an output signal proportional to the leading edge of said video signal; double integrating means connected to receive the output signal from said coincident gate means; means connecting the output of said double integrating means to said time modulator means to control the position of the gate whereby the gate is repositioned to follow any changes in the time between the transmitting of the energy pulse and the receiving of the reflected energy pulse; sensitivity control means having an input and an output; means connecting the input of said sensitivity control means to the output of said double integrating means; and means connecting the output of said sensitivity control means to said receiver means, said sensitivity control means being operable to decrease the receiver sensitivity as the output of the double integrating means decreases below a predetermined value.

17. A multiple range altimeter comprising: transmitter means for transmitting an energy pulse to a reflecting object; receiver means for receiving a reflected energy pulse, said receiver means including means for converting said reflected energy pulse to a video signal; sawtooth generating means adapted to receive a signal indicative of said transmitted pulse and operable in synchronism with the output of said transmitter means; double integrating means; comparator means connected to receive signals from said sawtooth generating means and said double integrating means and operable to produce an output signal when the instantaneous magnitude of the sawtooth signal is equal to the output of said double integrating means; gate generating means operable in response to the output signal from said comparator means for producing a gate output; coincident gate means connected to receive the video signal from said receiver means; means connecting the gate output from said gate generating means to said coincident gate means whereby said coincident gate means produces an output signal proportional to the leading edge of said video signal; means connecting the output signal from said coincident gate means to the input of said double integrating means; and range switching means connected to the output of said double integrating means and adapted to change the range of said altimeter when the output of said double integrating means reaches a predetermined magnitude.

18. An altimeter comprising: transmitter means for transmitting an energy pulse to a reflecting object; receiver means for receiving a reflected energy pulse from said object, said receiver means including means for converting said reflected energy pulse to a video signal; time modulator means responsive to a signal indicative of the transmitting of said energy pulse and operable so as to produce a gate output a known time after the occurrence of the transmitted energy pulse; a single coincident gate connected so as to receive said video signal; means connecting the gate output from said time modulator means to said coincident gate whereby said coincident gate produces a variable output signal proportional to the leading edge of said video signal; double integrating means connected to receive the variable output signal from said coincident gate to the exclusion of other variable signals, said double integrating means having a first output and a second output; means connecting the first output of said double integrating means to an altitude rate indicator; means connecting the second output of said double integrating means to said time modulator means to control the position of said gate whereby the gate is repositioned to follow any changes in the time between the occurrence of the transmitted energy pulse and said video signal; and means connecting the second output of said double integrating means to an altitude indicator.

19. A distance measuring device operable over a predetermined range comprising: time modulator means responsive to a first signal and operable so as to produce a first gate output and a second gate output a known time after the occurrence of said first signal; signal generating means for generating a second signal some time after the occurrence of said first signal; first and second coincident gate means connected so as to receive said second signal from said signal generating means; means connecting the first gate output from said time modulator means to said first coincident gate means whereby said first coincident gate means produces an output signal proportional to the leading edge of said second signal; double integrating means connected to receive the output signal from said first coincident gate means; means connecting the output of said double integrating means to said time modulator means to control the position of said first and second gates whereby the first and second gates are repositioned to follow any changes in the time between the occurrence of said first signal and said second signal; means connecting the second gate output from said time modulator means to said second coincident gate means whereby said second coincident gate means produces an output signal proportional to the magnitude of said second signal when said second gate output and said second signal are time coincident; means connecting the output of said second coincident gate means to said signal generating means, the output signal from said second coincident gate means controlling said signal generating means so as to hold the magnitude of said second signal constant; range sweep means having an input and an output; means connecting the input of said range sweep means to the output of said second coincident gate means, the output signal from said second coincident gate means holding said range sweep means inoperative; means connecting the output of said range sweep means to said double integrating means, whereby said range sweep means, when operative, sweeps the output of said double integrating means reaching said limit in one direction to sweep the output of said double integrating means to a limit in an opposite direction; sensitivity control means having an input and an output; means connecting the input of said sensitivity control means to the output of said double integrating means; and means connecting the output of said sensitivity control means to said signal generating means, said sensitivity control means being operable to decrease the sensitivity of said signal generating means as the output of the double integrating means decreases below a predetermined value.

20. An altimeter comprising: transmitter means for transmitting an energy pulse to a reflecting object; receiver means for receiving a reflected energy pulse from said object, said receiver means including means for converting said reflected energy pulse to a video signal; time modulator means responsive to a signal indicative of the transmitting of said energy pulse and operable so as to produce a gate output a known time after the occurrence of the transmitted energy pulse; a single coincident gate connected so as to receive said video signal; means connecting the gate output from said time modulator means to said coincident gate whereby said coincident gate produces a variable output signal proportional to the leading edge of said video signal; double integrating means connected to receive the variable output signal from said coincident gate to the exclusion of other variable signals; and means connecting the output of said double integrating means to said time modulator means to control the position of said gate whereby the gate is repositioned to follow any changes in the time between the occurrence of the transmitted energy pulse and said video signal.

21. A distance measuring device operable over a predetermined range comprising: time modulator means responsive to a first signal and operable so as to produce a first gate output and a second gate output a known time after the occurrence of said first signal; first and second coincident gate means connected so as to receive a second signal; means connecting the first gate output from said time modulator means to said first coincident gate means whereby said first coincident gate means produces an output signal proportional to the leading edge of said second signal; double integrating means connected to receive the output signal from said first coincident gate means, said double integrating means having a first output and a second output; means connecting the first output of said double integrating means to a rate of change of distance indicator; means connecting the second output of said double integrating means to said time modulator means to control the position of said first and second gates whereby the first and second gates are repositioned to follow any changes in the time between the occurrence of said first signal and said second signal; means connecting the second output of said double integrating means to a distance indicator; means connecting the second gate output from said time modulator means to said second coincident gate means whereby said second coincident gate means produces an output signal proportional to the magnitude of said second signal when said second gate output and said second signal are time coincident; range sweep means having an input and an output; means connecting the input of said range sweep means to the output of said second coincident gate means, the output signal from said second coincident gate means holding said range sweep means inoperative; means connecting the output of said range sweep means to said double integrating means, whereby said range sweep means, when operative, sweeps the second output of said double integrating means to a limit in one direction, said range sweep means further having means operative upon said double integrating means reaching said limit in one direction to sweep the second output of said double integrating means to a limit in an opposite direction; and periodic recycle means connected to said range sweep means, said periodic recycle means operating when said second gate output and said second signal are coincident to periodically activate said range sweep means, said periodic recycle means further being held inoperative when said second gate output and said second signal are out of coincidence.

22. A distance measuring device operable over a predetermined range comprising: time modulator means responsive to a first signal and operable so as to produce a first gate output and a second gate output a known time after the occurrence of said first signal; first and second coincident gate means connected so as to receive a second signal; means connecting the first gate output from said time modulator means to said first coincident gate means whereby said first coincident gate means produces an output signal proportional to the leading edge of said second signal; first and second integrating means each having an input and an output; means connecting the output of said first integrating means to the input of said second integrating means; means connecting the input of said first integrating means so as to receive the output signal from said first coincident gate means; means connecting the output of said second integrating means to said time modulator means, the output of said second integrating means controlling the position of said first and second gates whereby the first and second gates are repositioned to follow any changes in the time between the occurrence of said first signal and said second signal; means connecting the second gate output from said time modulator means to said second coincident gate means whereby said second coincident gate means produces an output signal proportional to the magnitude of said second signal when said second gate output and said second signal are time coincident; and range sweep means having an input connected to the output of said second coincident gate means and an output connected to the input of said second integrating means and comprising in combination control means connected so as to sense the output of said second coincident gate means and to hold said range sweep means inoperative when said second signal and said second gate output are in coincidence, said control means being further operative upon said second signal and said second gate output being out of coincidence to inhibit said first integrating means and to apply a substantially step input signal to the input of said second integrating means thereby sweeping the output of said second integrating means to a limit in one direction, recycle means having an input and an output, means connecting the input of said recycle means to the output of said second integrating means, means connecting the output of said recycle means to the input of said second integrating means, said recycle means becoming operative upon said second integrating means reaching said limit in one direction to sweep said second integrating means to a limit in an opposite direction, and stop recycle means connected so as to inhibit said recycle means when said second integrating means reaches said limit in an opposite direction and to allow said control means to again sweep said second integrating means to said limit in one direction.

23. A distance measuring device comprising: time modulator means responsive to a first signal and producing a first gate output and a second gate output; signal generating means for generating a second signal some time after the occurrence of said first signal; first and second coincident gate means connected so as to receive said second signal from said signal generating means; means connecting the first gate output from said time modulator means to said first coincident gate means whereby said first coincident gate means produces a variable output signal proportional to the leading edge of said second signal; double integrating means connected to receive the variable output signal from said first coincident gate means exclusive of any other variable signals; means connecting the output of said double integrating means to said time modulator means to control the position of said first and second gates whereby the first and second gates are repositioned to follow any changes in the time between the occurrence of said first signal and said second signal; means connecting the second gate output from said time modulator means to said second coincident gate means whereby said second coincident gate means produces an output signal proportional to the magnitude of said second signal when said second gate output and said second signal are time coincident; and means connecting the output of said second coincident gate means to said signal generating means, the output signal from said second coincident gate means controlling said signal generating means so as to hold the magnitude of said second signal constant.

24. A distance measuring device operable over a predetermined range comprising: time modulator means responsive to a first signal and operable so as to produce a first gate output and a second gate output a known time after the occurrence of said first signal; first and second coincident gate means connected so as to receive a second signal; means connecting the first gate output from said time modulator means to said first coincident gate means whereby said first coincident gate means produces an output signal proportional to the leading edge of said second signal; double integrating means connected to receive the output signal from said first coincident gate means; means connecting the output of said double integrating means to said time modulator means to control the position of said first and second gates whereby the first and second gates are repositioned to follow any changes in the time between the occurrence of said first signal and said second signal; means connecting the second gate output from said time modulator means to said second coincident gate means whereby said second coincident gate means produces an output signal proportional to the magnitude of said second signal when said second gate output and said second signal are time coincident; range sweep means having an input and an output; means connecting the input of said range sweep means to the output of said second coincident gate means, the output signal from said second coincident gate means holding said range sweep means inoperative; means connecting the output of said range sweep means to said double integrating means, whereby said range sweep means, when operative, sweeps the output of said double integrating means to a limit in one direction, said range sweep means further having means operative upon said double integrating means reaching said limit in one direction to sweep the output of said double integrating means to a limit in an opposite direction; and periodic recycle means connected to said range sweep means, said periodic recycle means operating when said second gate output and said second signal are coincident to periodically activate said range sweep means, said periodic recycle means further being held inoperative when said second gate output and said second signal are out of coincidence.

25. A distance measuring device operable over a predetermined range comprising: time modulator means responsive to a first signal and operable so as to produce a first gate output and a second gate output a known time after the occurrence of said first signal; first and second coincident gate means connected so as to receive a second signal; means connecting the first gate output from said time modulator means to said first coincident gate means whereby said first coincident gate means produces an output signal proportional to the leading edge of said second signal; first and second integrating means each having an input and an output; means connecting the output of said first integrating means to the input of said second integrating means and to a rate of change of distance indicator; means connecting the input of said first integrating means so as to receive the output signal from said first coincident gate means; means connecting the output of said second integrating means to said time modulator means, the output of said second integrating means controlling the position of said first and second gates whereby the first and second gates are repositioned to follow any changes in the time between the occurrence of said first signal and said second signal; means connecting the output of said second integrating means to a distance indicator; means connecting the second gate output from said time modulator means to said second coincident gate means whereby said second coincident gate means produces an output signal proportional to the magnitude of said second signal when said second gate output and said second signal are time coincident; range sweep means having an input connected to the output of said second coincident gate means and an output connected to the input of said second integrating means and comprising in combination control means connected so as to sense the output of said second coincident gate means and to hold said range sweep means inoperative when said second signal and said second gate output are in coincidence, said control means being further operative upon said second signal and said second gate output being out of coincidence to inhibit said first integrating means and to apply a substantially step input signal to the input of said second integrating means thereby sweeping the output of said second integrating means to a limit in one direction, recycle means having an input and an output, means connecting the input of said recycle means to the output of said second integrating means, means connecting the output of said recycle means to the input of said second integrating means, said recycle means becoming operative upon said second integrating means reaching said limit in one direction to sweep said second integrating means to a limit in an opposite direction, and stop recycle means connected so as to inhibit said recycle means when said second integrating means reaches said limit in an opposite direction and to allow said control means to again sweep said second integrating means to said limit in one direction; and periodic recycle means having an input connected to the output of said control means and an output connected to the input of said control means, and operating to periodically activate said control means when said second signal and said second gate output are in coincidence, said periodic recycle further being inoperative when said second signal and said second gate output are out of coincidence.

26. A distance measuring device operable over a predetermined range comprising: time modulator means responsive to a first signal and operable so as to produce a first gate output and a second gate output a known time after the occurrence of said first signal; first and second coincident gate means connected so as to receive a second signal; means connecting the first gate output from said time modulator means to said first coincident gate means whereby said first coincident gate means produces an output signal proportional to the leading edge of said second signal; first and second integrating means each having an input and an output; means connecting the output of said first integrating means to the input of said second integrating means; means connecting the input of said first integrating means so as to receive the output signal from said first coincident gate means; means connecting the output of said second integrating means to said time modulator means, the output of said second integrating means controlling the position of said first and second gates whereby the first and second gates are repositioned to follow any changes in the time between the occurrence of said first signal and said second signal; means connecting the second gate output from said time modulator means to said second coincident gate means whereby said second coincident gate means produces an output signal proportional to the magnitude of said second signal when said second gate output and said second signal are time coincident; range sweep means having an input connected to the output of said second coincident gate means and an output connected to the input of said second integrating means and comprising in combination control means connected so as to sense the output of said second coincident gate means and to hold said range sweep means inoperative when said second signal and said second gate output are in coincidence, said control means being further operative upon said second signal and said second gate output being out of coincidence to inhibit said first integrating means and to apply a substantially step input signal to the input of said second integrating means thereby sweeping the output of said second integrating means to a limit in one direction, recycle means having an input and an output, means connecting the input of said recycle means to the output of said second integrating means, means connecting the output of said recycle means to the input of said second integrating means, said recycle means becoming operative upon said second integrating means reaching said limit in one direction to sweep said second integrating means to a limit in an opposite direction, and stop recycle means connected so as to inhibit said recycle means when said second integrating means reaches said limit in an opposite direction and to allow said control means to again sweep said second integrating means to said limit in one direction; and periodic recycle means having an input connected to the output of said control means and an output connected to the input of said control means, and operating to periodically activate said control means when said second signal and said second gate output are in coincidence, said periodic recycle further being inoperative when said second signal and said second gate output are out of coincidence.

27. An altimeter comprising: transmitter means for transmitting an energy pulse to a reflecting object; receiver means for receiving a reflected energy pulse from said object, said receiver means including means for converting said reflected energy pulse to a video signal; time modulator means adapted to receive a signal indicative of said transmitted pulse and operable so as to produce a first and a second gate output a known time after the output of said transmitter means; first and second coincident gate means connected so as to receive said video signal; means connecting the first gate output from said time modulator means to said first coincident gate means whereby said first coincident gate means produces an output signal proportional to the leading edge of said video signal; double integrating means connected to receive the output signal from said first coincident gate means; means connecting the output of said double integrating means to said time modulator means to control the position of the first and second gates whereby the first and second gates are repositioned to follow any changes in the time between the transmitting of the energy pulse and the receiving of the reflected energy pulse; means connecting the second gate output from said time modulator means to said second coincident gate means whereby said second coincident gate means produces an output signal proportional to the magnitude of said video pulse; means connecting the output signal from said second coincident gate means to said receiver means so as to control the gain of said receiver means and hold the magnitude of said video signal constant; and range sweep means having an input and an output; means connecting the input of said range sweep means to the output of said second coincident gate means; the output signal from said second coincident gate means holding said range sweep means inoperative; and means connecting the output of said range sweep means to said double integrating means, whereby said range sweep means, when operative, sweeps the output of said double integrating means to a limit in one direction, said range sweep means further having means operative upon said double integrating means reaching said limit in one direction to sweep the output of said double integrating means to a limit in an opposite direction.

28. An altimeter comprising: transmitter means for transmitting an energy pulse to a reflecting object; receiver means for receiving a reflected energy pulse from said object, said receiver means including means for converting said reflected energy pulse to a video signal; time modulator means adapted to receive a signal indicative of said transmitted pulse and operable so as to produce a first and a second gate output a known time after the output of said transmitter means; first and second coincident gate means connected so as to receive said video signal; means connecting the first gate output from said time modulator means to said first coincident gate means whereby said first coincident gate means produces an output signal proportional to the leading edge of said video signal; double integrating means connected to receive the output signal from said first coincident gate means; means connecting the output of said double integrating means to said time modulator means to control the position of the first and second gates whereby the first and second gates are repositioned to follow any changes in the time between the transmitting of the energy pulse and the receiving of the reflected energy pulse; means connecting the second gate output from said time modulator means to said second coincident gate means whereby said second coincident gate means produces an output signal proportional to the magnitude of said video pulse; means connecting the output signal from said second coincident gate means to said receiver means so as to control the gain of said receiver means and hold the magnitude of said video signal constant; sensitivity control means having an input and an output; means connecting the input of said sensitivity control means to the output of said double integrating means; and means connecting the output of said sensitivity control means to said receiver means, said sensitivity control means being operable to progressively decrease the receiver sensitivity as the output of the double integrating means decreases below a predetermined value.

29. An altimeter comprising: transmitter means for transmitting an energy pulse to a reflecting object; receiver means for receiving a reflected energy pulse from said object, said receiver means including means for converting said reflected energy pulse to a video signal; sawtooth generating means adapted to receive a signal indicative of said transmitted pulse and operable in synchronism with the output of said transmitter means; double integrating means; comparator means connected to receive signals from said sawtooth generating means and said double integrating means and operable to produce an output signal when the instantaneous magnitude of the sawtooth signal is equal to the output of said double integrating means; gate generating means operable in response to the output signal from said comparator means for producing a gate output; coincident gate means; a video bus having an input connected to receive the video signal from said receiver means and an output connected to said coincident gate means; means connecting the gate output from said gate generating means to said coincident gate means whereby said coincident gate means produces an output signal proportional to the leading edge of said video signal; means connecting the output signal from said coincident gate means to the input of said double integrating means; noise automatic gain control means having an input and an output; means connecting the input of said noise automatic gain control means to said video bus; and means connecting the output of said noise automatic gain control means to said receiver, said noise automatic gain control means operating to sense the noise level on said video bus and to control the receiver to hold said noise level substantially constant.

30. A distance measuring device operable over predetermined ranges comprising: time modulator means responsive to a first signal and operable so as to produce a first gate output and a second gate output a known time after the occurrence of said first signal; signal generating means for generating a second signal some time after the occurrence of said first signal; first and second coincident gate means connected so as to receive said second signal from said signal generating means; means connecting the first gate output from said time modulator means to said first coincident gate means whereby said first coincident gate means produces an output signal proportional to the leading edge of said second signal; double integrating means connected to receive the output signal from said first coincident gate means; means connecting the output of said double integrating means to said time modulator means to control the position of said first and second gates whereby the first and second gates are repositioned to follow any changes in the time between the occurrence of said first signal and said second signal; means connecting the second gate output from said time modulator means to said second coincident gate means whereby said second coincident gate means produces an output signal proportional to the magnitude of said second signal when said second gate output and said second signal are time coincident; means connecting the output of said second coincident gate means to said signal generating means, the output signal from said second coincident gate means controlling said signal generating means so as to hold the magnitude of said second signal constant; range sweep means having an input and an output; means connecting the input of said range sweep means to the output of said second coincident gate means, the output signal from said second coincident gate means holding said range sweep means inoperative; means connecting the output of said range sweep means to said double integrating means, whereby said range sweep means, when operative, sweeps the output of said double integrating means reaching said limit in one direction to sweep the output of said double integrating means to a limit in an opposite direction; and range switching means connected to the output of said double integrating means and adapted to change the range of said distance measuring device when the output of said double integrating means reaches a predetermined magnitude.

31. An altimeter comprising: transmitter means for transmitting an energy pulse to a reflecting object; receiver means for receiving a reflected energy pulse from said object, said receiver means including means for converting said reflected energy pulse to a video signal; time modulator means responsive to a signal indicative of the transmitting of said energy pulse and operable so as to produce a gate output a known time after the occurrence of the transmitted energy pulse; a coincident gate; a video bus having an input connected so as to receive said video signal and an output connected to said coincident gate; means connecting the gate output from said time modulator means to said coincident gate whereby said coincident gate produces a variable output signal proportional to the leading edge of said video signal; double integrating means connected to receive the variable output signal from said coincident gate exclusive of any other variable signals; means connecting the output of said double integrating means to said time modulator means to control the position of said gate whereby the gate is repositioned to follow any changes in the time between the occurrence of the transmitted energy pulse and said video signal; noise automatic gain control means having an input and an output; means connecting the input of said noise automatic gain control means to said video bus; and means connecting the output of said noise automatic gain control means to said receiver, said noise automatic gain control means operating to sense the noise level on said video bus and to control the receiver to hold said noise level substantially constant.

32. A radar altimeter comprising: transmitter means for transmitting a radio frequency energy pulse to a reflecting object; receiver means for receiving said energy pulse after said energy pulse has reflected from said reflecting object; said receiver including means for converting the reflected energy pulse to a video signal; tracking means for tracking said video signal and adapted to produce an output signal proportional to the time between the transmitting of said energy pulse and the receiving of said reflected energy pulse; and memory means having an input and an output, said input being connected so as to receive the output signal from said tracking means and said output being adapted to be connected to an altitude indicator, said memory means being operable to remember the magnitude of the output signal from said tracking means for a predetermined time in the event that said tracking means loses track of said video signal.

33. A distance measuring device comprising: transmitter means for transmitting an energy pulse to a reflecting object; receiver means for receiving said energy pulse after said energy pulse has reflected from said reflecting object; tracking means for tracking the reflected energy pulse, said tracking means being adapted to produce an output signal proportional to the time between the transmitting of said energy pulse and the receiving of the reflected energy pulse; and memory means having an input and an output, said input being connected so as to receive the output signal from said tracking means, and said output being adapted to be connected to a distance indicator, said memory means being operable to remember the magnitude of the output signal from said tracking means for a predetermined time in the event that said tracking means loses track of the reflected energy pulse.

34. Distance measuring apparatus comprising: transmitter means for transmitting an energy pulse to a reflecting object; receiver means for receiving a reflected energy pulse from said object, said received means including means for converting said reflected energy pulse to a video signal; and means for deriving distance indicating signals from only the leading edge of said video signal.

35. Distance measuring apparatus comprising: transmitter means for transmitting an energy pulse to a distant reflecting object; receiver means for receiving an energy pulse reflected from said object, said receiver means including means for converting said reflected energy pulse to a video signal; means responsive to the video signal for developing a continuous signal indicative of the distance to said object from said video signal; and means responsive to said continuous signal for varying the sensitivity of said receiver means as a function of the distance to said object.

References Cited by the Examiner

UNITED STATES PATENTS

| | | | |
|---|---|---|---|
| 2,498,381 | 2/1950 | Smith | 343—5 |
| 2,542,032 | 2/1951 | Isbister et al. | 343—5 |
| 2,562,309 | 7/1951 | Fredrick | 343—13 |
| 2,711,531 | 6/1955 | Murdock | 343—17.1 |
| 2,741,742 | 4/1956 | Moore | 343—13 |
| 2,886,810 | 5/1959 | Gleason | 343—7.3 |
| 3,013,208 | 12/1961 | Voznak | 343—13 |
| 3,013,260 | 12/1961 | Schwalbe | 343—13 |
| 3,040,311 | 6/1962 | Segerstrom | 343—13 |
| 3,078,457 | 2/1963 | Himler et al. | 343—13 |
| 3,085,243 | 4/1963 | Bond | 343—13 |
| 3,121,869 | 2/1964 | Alpers | 343—7.3 |

CHESTER L. JUSTUS, *Primary Examiner.*

KATHLEEN CLAFFY, *Examiner.*

R. E. KLEIN, *Assistant Examiner.*